(12) United States Patent
Duca

(10) Patent No.: US 10,829,349 B2
(45) Date of Patent: Nov. 10, 2020

(54) CONTAINER HANDLING EQUIPMENT CONTROLLER ARRANGEMENT

(71) Applicant: APM Terminals B.V., The Hague (NL)

(72) Inventor: Alexandru Duca, The Hague (NL)

(73) Assignee: APM TERMINALS B.V., The Hague (DK)

( * ) Notice: Subject to any disclaimer, the term of this patent is extended or adjusted under 35 U.S.C. 154(b) by 63 days.

(21) Appl. No.: 16/086,871

(22) PCT Filed: Mar. 20, 2017

(86) PCT No.: PCT/EP2017/056593
§ 371 (c)(1),
(2) Date: Sep. 20, 2018

(87) PCT Pub. No.: WO2017/162606
PCT Pub. Date: Sep. 28, 2017

(65) Prior Publication Data
US 2019/0102712 A1 Apr. 4, 2019

(30) Foreign Application Priority Data
Mar. 21, 2016 (DK) .................................. 2016 00171

(51) Int. Cl.
*B66C 19/00* (2006.01)
*B66C 13/48* (2006.01)
(Continued)

(52) U.S. Cl.
CPC .......... *B66C 19/007* (2013.01); *B65G 1/0407* (2013.01); *B65G 1/0421* (2013.01);
(Continued)

(58) Field of Classification Search
CPC ..... B66C 19/002; B66C 19/007; B66C 13/48; B65G 1/0421
See application file for complete search history.

(56) References Cited

U.S. PATENT DOCUMENTS

2004/0126015 A1* 7/2004 Hadell .................. B66C 19/002
382/181
2006/0276930 A1* 12/2006 Tsujimoto ............ B65G 1/0492
700/214
(Continued)

FOREIGN PATENT DOCUMENTS

EP 2 775 429 A1 9/2014
WO 98/34127 A1 8/1998
(Continued)

*Primary Examiner* — Thomas Randazzo
(74) *Attorney, Agent, or Firm* — Snyder, Clark, Lesch & Chung, LLP

(57) ABSTRACT

A CHE controller arrangement comprises: an execution controller in operative connection with one or more engines of the CHE and configured to control movement of the CHE; a communication controller having a memory to at least store a job to be executed by said CHE, the communication controller further comprising a first interface to retrieve instructions from an external instance, and particular from a terminal operating system related to a plurality of jobs to be executed by said CHE and a second interface to communicate with at least a second CHE; a control interface between the execution controller and the communication controller being adapted to provide instructions to the execution controller responsive to an execution of said job, and the second inter face being adapted to forward at least one job of the plurality of jobs in response to a respective request by said at least one second CHE.

15 Claims, 10 Drawing Sheets

(51) Int. Cl.
*B65G 1/04* (2006.01)
*B65G 63/00* (2006.01)
*G06Q 50/28* (2012.01)
*B66C 13/46* (2006.01)
*G06Q 10/06* (2012.01)

(52) U.S. Cl.
CPC ......... *B65G 1/0457* (2013.01); *B65G 1/0464* (2013.01); *B65G 63/004* (2013.01); *B66C 13/46* (2013.01); *B66C 13/48* (2013.01); *B66C 19/002* (2013.01); *G06Q 50/28* (2013.01); *G06Q 10/0631* (2013.01)

(56) References Cited

U.S. PATENT DOCUMENTS

| | | | | |
|---|---|---|---|---|
| 2006/0285948 A1* | 12/2006 | Tsujimoto | ............ | B65G 1/0407 414/279 |
| 2006/0291992 A1* | 12/2006 | Tsujimoto | ............. | B65G 43/00 414/807 |
| 2007/0032903 A1* | 2/2007 | Tsujimoto | ............ | B65G 1/0407 700/214 |
| 2008/0053941 A1* | 3/2008 | Tsukamoto | .......... | B65G 1/0421 211/134 |
| 2010/0021272 A1 | 1/2010 | Ward et al. | | |
| 2011/0017693 A1* | 1/2011 | Thomas | .................. | B66C 13/16 212/270 |
| 2011/0276175 A1* | 11/2011 | Takagawa | ........... | B65G 1/0421 700/218 |
| 2013/0211568 A1* | 8/2013 | Chen | .................. | G05B 19/4186 700/96 |
| 2013/0236284 A1* | 9/2013 | Alba | ..................... | B66C 19/002 414/790.9 |
| 2014/0079513 A1* | 3/2014 | Kasai | .................. | B65G 63/004 414/139.4 |
| 2014/0156786 A1* | 6/2014 | Boskovic | ................ | G06F 9/547 709/217 |
| 2015/0149026 A1* | 5/2015 | Oswald | ................... | B66C 23/88 701/29.3 |
| 2015/0353330 A1* | 12/2015 | Foldesi | ................ | B65G 67/603 414/561 |
| 2016/0009531 A1* | 1/2016 | Saliba | ............. | G06Q 10/06312 701/19 |

FOREIGN PATENT DOCUMENTS

| | | |
|---|---|---|
| WO | 02/14202 A1 | 2/2002 |
| WO | 2006093744 A2 | 9/2006 |
| WO | 2014/135191 A1 | 9/2014 |

\* cited by examiner

CONTAINER HANDLING EQUIPMENT CONTROLLER ARRANGEMENT

CROSS-REFERENCE TO RELATED APPLICATIONS

This application is a national stage application that claims the benefit of International Application No. PCT/EP2017/056593, filed Mar. 20, 2017, which claims the benefit of Danish Patent Application No. PA201600171, filed Mar. 21, 2016, the disclosures of which are incorporated herein by reference in their entirety.

TECHNICAL FIELD

The present disclosure is related to a communication arrangement for a container handling equipment operating in a predetermined area and to a method of communicating between at least two container handling equipment operating within a predetermined area. The present disclosure is also related to a container handling equipment controller arrangement, short CHE controller arrangement.

BACKGROUND

Operators of port facilities strive in optimizing every aspect of transport of containers while minimizing costs and environmental impacts. One relative new proposal for optimization is to reduce the service speed of large container-ships significantly whereby fuel consumption is reduced likewise significantly. In order to make up for some of the time lost during sailing, owners and operators now urge container handling facilities, or container terminals, to operate even faster.

The container handling capacity or the performance of container terminals using ship to shore cranes is often limited by the operation of container handling equipment—which is also called herein by the acronym CHE or CHEs in the plural form and which are for instance gantry cranes or other crane types. The efficient and effective distribution, stacking and movement of containers becomes increasingly important, while misplacements should be avoided. The increased need for speed results in a larger density of container handling equipment working in the same operational area, or in other words different CHEs are working in the same area. The increased complexity of container handling or unforeseeable events may lead to situations, in which the load of available CHEs is not evenly distributed such that some CHEs are idle, while others still have many tasks to perform.

EP 2 775 429 A1 discloses a method for scheduling work orders between at least two automated stacking cranes. A plurality of work orders for the cranes is received and the priority for those work orders is determined. Controllers in each crane can operate with each other to determine the priority of a work order. The determination regarding which work order is to be performed by which crane can also be made between the cranes themselves in a distributed control manner.

There is still a need to improve the efficiency and effectiveness of CHEs in an operational area.

SUMMARY

The object is satisfied by a CHE controller arrangement in accordance with the features of claim 1. Further embodiments of the present invention are described in the dependent claims, the description and the drawings.

A communication arrangement or a communication system to enable a plurality of container handling equipment, or CHEs, to operate autonomously in a yard environment is disclosed. Such yard environment includes all environments in which large amounts of container-like structures have to be moved and logistic operations take place, including but not limited to port yard, rail yards or airports. The term CHE or CHEs in the plural form corresponds to container handling equipment, which comprises all sorts of cranes, like for instance gantry cranes or ship-to-shore cranes and also other types of equipment, like fork lifter, lift trucks and the like. For the sake of simplicity, at some instances the expression crane may be used for such equipment and it is understood that the present disclosure is suitable for all kinds of container handling equipment.

In this regard, the term autonomously refers to the actual execution of jobs by the plurality of CHEs without interference from an external control layer or the terminal operating system, except that the operating system provides a list of jobs to the CHEs. While in conventional solutions an operator controls specific movement of the CHEs manually to execute the job, the present disclosure proposes that the plurality of CHEs communicates with each other in order to avoid interference while executing their job. In addition, the plurality of CHEs is enabled to share jobs, that is simply spoken one CHE executes a job originally given to another CHE by the terminal operating system. Consequently, each CHE in a specific operational area may execute its respective own jobs and when possible shared jobs as well. The job sharing takes place on the layer of communication controller within the CHEs and without interference or triggering from external instances. The expression "external instance" may refer in this context to any logistics system. As a result, the CHEs achieve a more evenly workload distribution when operating in a certain area.

In this regard, the term "job" stands for an order to the CHE to move a container from a determined given container spot in the operational area, the so called source position to a destination spot, the destination position. The destination spot may be another container spot in the area, but also a track or train wagon and the like. This may require moving the CHE to the source position, lifting the container, moving to the destination position and releasing the container at said position again.

The communication between the CHEs is triggered without interference from a manual operator, the terminal operating system or any other external instance. Such autonomous behaviour enable the CHE not only to "know" the positions of each other CHE working in an operational area, but also to execute jobs and share jobs even when communication to a higher layer or to an external instance is temporarily offline. The collaborative logic and behaviour is independent on the number or type of the CHEs and only in case of failure of communication between the handling equipment within the operational area, a manual operator may take action.

The CHE controller arrangement, in particular for a CHE, comprises an execution controller in operative connection with one or more engines of the CHE and configured to control movement of the CHE and the CHE controller arrangement further comprises a communication controller having a memory to at least store a job to be executed by said CHE, the communication controller further comprises a first interface to retrieve instructions from an external instance, and in particular from a terminal operating system related to a plurality of jobs to be executed by said CHE and a second interface to communicate with at least a second CHE. The CHE controller arrangement can further comprise a control interface between the execution controller and the communication controller to provide instructions to the execution controller responsive to an execution of said job, and the second interface is adapted to forward at least one job of the plurality of jobs in response to a respective request by said at least one second CHE.

The first CHE can execute its own jobs and, if possible, share jobs with the at least one second CHE. The communication controllers of the CHEs are equal meaning that they operate at the same hierarchical level. The second interface can be adapted to forward a job in response to a respective request by the second CHE. Thus, the first CHE does not simply distribute a job to the second CHE, but only forwards a job upon a respective request from the second CHE. This job sharing can take place without interference from the external instance and as a result of the job sharing, the CHEs can achieve a more evenly workload distribution when operating in a certain area.

The first CHE can not force the second CHE to carry out the forwarded job. The second CHE may be adapted to decide on its own, for example based on a pregiven criteria, whether it accepts the job. The communication controller of the second CHE may be adapted to send a respective confirmation message. Upon reception of the confirmation message, the communication controller of the first CHE may delete the job from its memory and/or communicate to the external instance that the job has been forwarded to the second CHE.

The second CHE may be adapted to send a respective request for a job based on a certain pregiven criteria, for example when the number of jobs stored in the memory of the second CHE drops below a predetermined amount.

The execution controller can be arranged on or within the CHE. The same can be said for the communication controller which may also be incorporated into the same device/unit as the execution controller. However, the communication controller may also be locally separate from the execution controller and communicate with it through the control interface by use of a protocol. The communication controller may also be arranged at a distance to the CHE or at least at the outside of the CHE, for example in a separate unit. The communication controller can for example be located in between the CHE and the external instance. The communication controller can therefore be regarded as an add-on which is a separate part or device. This has the advantage that the CHE as it is provided by a manufacturer does not have to be changed or modified.

BRIEF DESCRIPTION OF THE DRAWINGS

Various aspects and details as well as the benefits and advantages of the foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
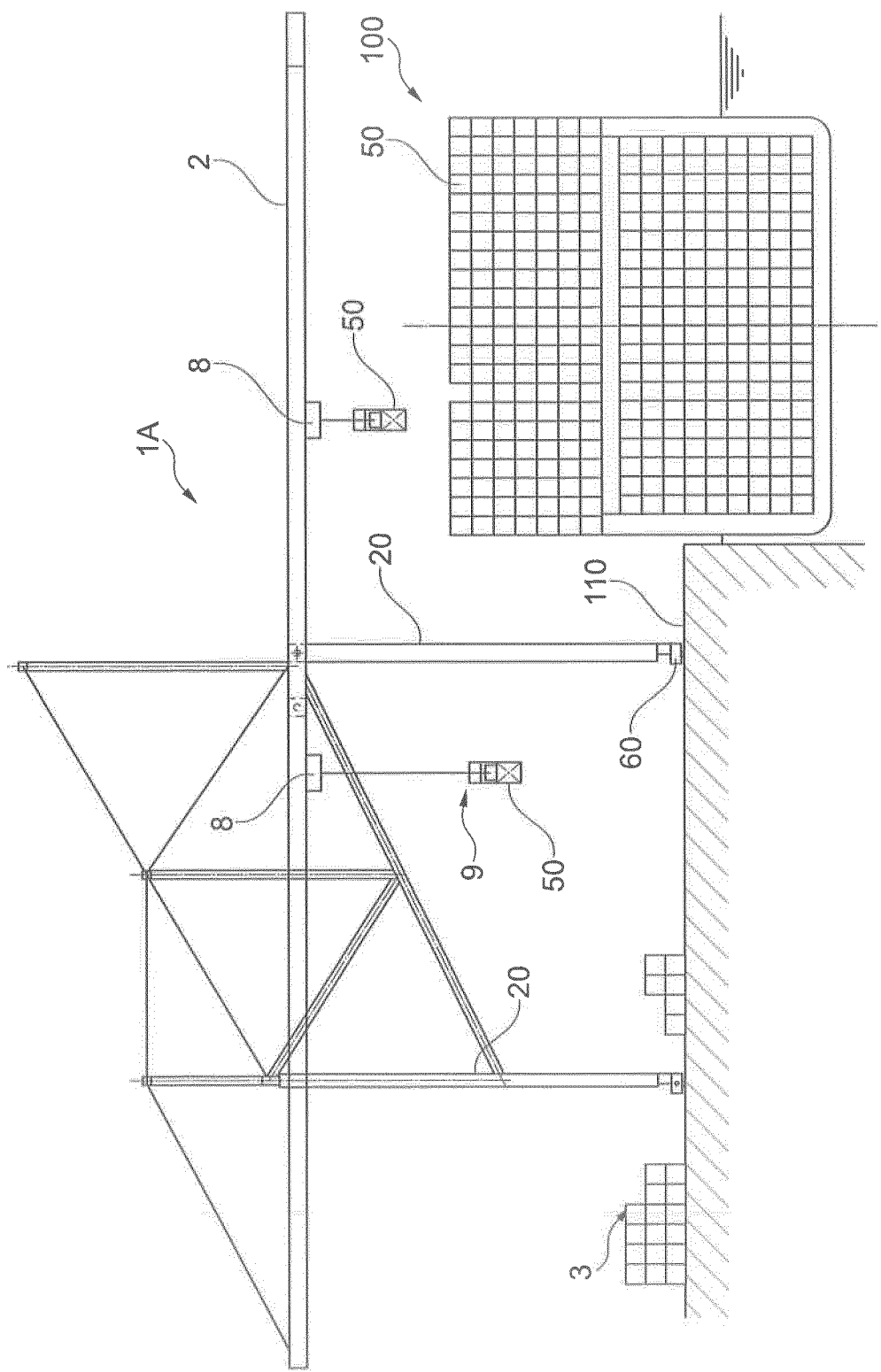
FIG. 1 illustrates a schematic section of a port facility including a ship-to-shore crane.

Aspects of the present disclosure will be described more fully hereinafter with reference to the accompanying drawings. The apparatus and method disclosed herein can, however, be realized in many different forms and should not be construed as being limited to the aspects set forth herein. Features in the embodiments can be combined in different ways without deviating from the spirit of the present disclosure. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise. In the following the expression "job" will be used in accordance with the meaning stated above.

In an aspect of the proposed principle a container handling equipment or CHE controller arrangement comprises an execution controller and a communication controller. The execution controller is in operative connection with one or more engines or other subsystems of the CHE and configured to control movement of the CHE. The execution controller is coupled to the communication controller via a control interface. The communication controller comprises a memory to store a job to be executed by the CHE and also comprises a first and a second interface. Via the first interface, the communication controller is configured to retrieve instructions from an external instance, and in particular from a terminal operating system related to a plurality of jobs to be executed by said CHE. The second interface is utilized by the communication controller to communicate with at least a second CHE to forward at least one job of the plurality of jobs in response to a respective request by said at least one second CHE. Via the controller interface the communication controller is adapted to provide instructions to the execution controller responsive to an execution of said job.

The job sharing functionality provides the controller to balance workload among different CHEs in an independent and autonomous way without interference from higher layers or instances an in particular without interference from the TOS. The separation between the execution controller and the communication controller provides a large flexibility with respect to handling jobs in a manual, semi-autonomous and fully autonomous way. Already existing CHEs can be improved by applying the communication controller into an already existing structure. The communication and instruction flow allows working in mixed environment, in which manually operated and autonomous CHE are operating in the same area.

To improve reliability and availability of the CHE, the first and second interface can be configured to utilize different communication protocols. The communication protocol used for communication with other CHEs may be particular robust against any kind of interference or communication disruptions. Communication formats and structure can be simple and robust.

The job sharing functionality enables the CHE to balance its work within a predetermined area. To ensure a more even work distribution, the communication controller may be configured to request a job to be executed via the second interface from the at least one second CHE. As a result, jobs are only shared when requested, or in other words the communication controller evaluates its current job status and requests a job only if idle. In this regard, jobs are handled and processed uniformously by the communication controller and the communication controller stores each job retrieved via the first or the second interface in its memory prior to execution.

When sharing a job, the communication controller may evaluate the available jobs and select a suitable job. In an aspect, the communication controller is configured to select the at least one job of the plurality of jobs in response to a position of the at least one second CHE. Such selection can also be based in response to a distance between the CHE and a position of the at least one job or a combination of the above. Various other parameters, like container type, CHE type and the like can be taken into account for the evaluation.

To avoid collisions between CHEs or other potential dangerous situations, but also improve speed and efficiency when performing jobs, the communication controller can be configured to forward to the at least one second CHE its position when entering or leaving a predetermined area. Such position information can also be transmitted on regular basis, at specific intervals or specific locations within the pre-determined area. The communication controller can comprise a memory to store position information provided by said at least one second CHE.

In this regard the memory to which the communication controller is coupled and which stores the information about the job to be executed is adapted to store further information such as yard map, both logical (TOS positions) and physical (actual coordinates or marker values). The communication controller and the execution controller are configured to have access thereupon to read the necessary information to perform the jobs and avoid potential collisions. The information can be updated from time to time by the communication controller via the first interface. In addition, the communication or execution controller may store information related to container locations in such memory. Synchronization with the terminal operating system or an externa logistics may detect possible handling errors and avoid accidentally loosing containers.

When executing a job, the communication controller may provide respective information to the execution controller. In view of the above situation, in which more than one CHE is operating in a predetermined area, the communication controller may be configured to provide instructions to the execution controller based on position information of said at least one second CHE. Instructions taking into account the positions of other CHEs operating in the same pre-determined area greatly reduce the risk of potentially dangerous situations, for instance two CHE getting to close to each other.

Another aspect is related to improvement of existing CHEs. In an aspect, the CHE comprises a third interface coupled to the communication controller, wherein the communication controller is configured to provide various information to a manual operator. Such information can for instance include one or more jobs to be executed or parts thereof. A position of the operator's CHE in a predetermined area and also a position of other CHEs in the predetermined area. In conventional manual systems the operator controls movement of the CHE. Hence, in an aspect, the communication controller is configured to retrieve an input from the manual operator related to a movement of the CHE input via a third interface. The input can be processed and forwarded to the execution controller via the control interface. In another aspect, the CHE comprises a plurality of sensors and other sub-systems configured to provide information about the absolute or relative position of the CHE or parts thereof. For example such parts can comprise hoist, trolley, twist lock position gantry position, speed of the previous parts and the like. The plurality of sensors and subsystems is coupled to the execution controller. The information provided by the sensor may be used by the execution controller to control movement, but also by the communication controller. For instance positon information provided by the sensors may be communicated by the communication controller to other CHEs operating in the same area.

The execution controller is in operative connection with programmable logic controllers, programmable logic relays or other devices configured to control the movement of the elements of the CHE, these may include a gantry of a CHE, a trolley of the CHE, a hoist of the CHE and/or lock element, in particular twist lock elements.

Preferably, a communication arrangement for a CHE or at least two CHEs is described, wherein said CHE or said at least two CHEs is/are configured to operate on an area comprising a plurality of container spots arranged in a plurality of rows and columns. Another organization of container spots is possible as well and depending on available space, yard or port structure and so on. In any case the container spots are organized in a defined pattern allowing the CHE/CHEs to locate and identify a specific spot in the plurality of spots.

The proposed communication arrangement can comprise a first communication module and a second communication module, in particular for each CHE. The first communication module is configured to retrieve from a terminal operating system a plurality of jobs to be performed by said CHE on said yard, said jobs comprising instructions to move a container and identifying a container spot of the plurality of container spots. The second communication module is configured to communicate with at least a second CHE operating in said operational area, said communication with said at least one second CHE being autonomous from receipts from the first communication module and/or manual triggering and including at least transmitting a message to said at least one second CHE indicating a position of said CHE in the area. In addition, the second communication module is configured to autonomously transmit a job sharing message to the at least one second CHE, said job sharing message indicating a job to be performed by the at least one second CHE, said job being a job of the plurality of jobs.

The two communication modules consequently serve different tasks. While the first one is adapted for communication with external instances, in particular the terminal operating system, the second module is responsible and adapted for communication between container handling equipment operating in the same defined area. The job sharing functionality enables the CHEs to balance workload among themselves in an independent and autonomous way without interference from higher layers or instances and in particular without interference from the TOS. Workload balancing results in a more even distribution of work among the CHEs, less idle time and a higher degree of capacity utilization. In an aspect the second communication module is configured to transmit the job sharing message indicating a specific type of CHE. Particular in an environment, wherein different types of CHEs are operating such approach will prevent that a CHE is taking a job that is not suitable for it.

As a result of the proposed work-split as described above, an external instance does not require any more knowledge about the current situation in a section of an operational area or in the whole area itself that is which rows, columns or spots are currently occupied. Collision prevention is handled autonomously between the CHEs. Due to the job sharing functionality, uneven distribution or delays in job execution can be dealt within the operational area between the CHEs. In other words, communication between the CHEs and communication to higher layers and external control instances are separated and independent from each other.

The proposed solution does not only reduce the amount of data to be sent from an external instance to each individual CHE, it also relieves the external instance from adjusting the job lists or controlling the execution of jobs to avoid potential conflicts or collisions. These aspects are handled by the CHEs autonomously utilizing the second communication module.

In a further aspect, the first and second communication modules are operating with different communication protocols, different communication standards, different frequencies or a combination thereof. For instance, communication by the first module can be achieved using wired communication, while communication between CHEs in a defined operational area is achieved using a wireless communication link or vice versa. Alternatively two different wireless communication standards on different frequencies can be used. Such separation between communication by the first and second modules allows CHEs to continue working in an off-line mode that is when communication to the external instances is temporarily off-line. On the other hand, the external instance can be informed in case communication between CHEs in certain area fails among other measures taken by a CHE itself or the CHEs. In this regard it is suitable to select a simple yet robust communication protocol or standard for the second communication module.

Depending on the communication protocol (but not only then), the second communication module is configured to request a token from any other CHE in the same operational area. The token is a request for subsequent communication prior to transmitting the actual message. The token request is broadcasted among all other CHEs in the operational area. Such token request can prevent colliding transmissions from two or more CHEs as only the communication module which has the token is allowed to send further transmissions. Token based communication can be implemented in the communication protocol, such as token-ring based communication. Alternatively, communication between CHEs can be time-duplexed, that is the second communication module of each CHE in the area is configured to transmit messages (and/or acknowledgement) only at specific periodic time slots. In such case synchronization as to the available and occupied time slots is required when a CHE enters or leaves the operational area.

The token may be transmitted prior to the actual message in any case or based on an evaluation of at least one position in the operational area, which will be occupied when performing a subsequent job of the plurality of jobs or when requests to other CHEs are to be made. Broadcasting a token request only in particular circumstances introduces some form of priority in the communication and indicates a higher level of importance for the upcoming transmission.

The position indicated in the message transmitted by the second module can comprise an indication that said CHE is about to or has entered the operational area at said positon. Such message resembles a hand-shake procedure, in which a CHE informs all other CHEs in a specific operational area. Alternatively or additionally, the second communication module is configured to transmit a message indicating the current position of said CHE while said CHE is passing through a row or indicating the position said CHE is currently working in. In addition, job execution may require blocking a specific container spot or area over a certain period of time in order to enable timely execution of a job. Consequently, the second communication module can be configured to transmit a message requesting a position not to be occupied for a certain period of time.

Some communications for which the second module is configured for are of indicative nature. Other communications may indicate a request. The second module may be configured to transmit a message to the at least one second CHE indicating a request to said at least one second CHE to perform a specific task specified in said message or to acknowledge a specific information provided by said CHE. Said task can include, but not limited to, releasing a specific area or container spot, moving out of the way, not blocking a certain container spot or yard area, keep away from a certain position and the like. It is suitable in some aspects, also to transmit an acknowledgment, particular as a response to a request message or important information, handshake message. Such acknowledgment enables the requesting second communication module to ensure the message has been retrieved.

Another aspect is as already indicated related to a job sharing functionality. As stated previously the term job is an order to the CHE to move a container from a determined position to another position given in the job. The job should therefore contain information at least about the source and the destination of the container as well as an identification of the container. The latter is suitable as the combination of source and destination could be used more than one in a job list. Further containers identification allows to track and identify containers within the operational area, even when a container has accidently been misplaced.

While an external instance provides a plurality of jobs to be performed and control modules within the CHE execute these jobs in a predetermined order (either autonomously or utilized by a manual operator), it may occur that a CHE in the operational area is empty of jobs and therefore idle. It is suggested in such cases that jobs can be shared autonomously among the CHE themselves utilizing the second communication module without being instructed by an external instance. In other words, the or each CHE and/or the second communication module of at least one CHE or of each CHE may be configured to share jobs to be performed with each other based on availability and need. In an aspect, the second communication module is configured to transmit a job sharing message to another CHE within the same operational area, said job sharing message indicating a job to be performed by the at least one second CHE, said job being a job of the plurality of jobs. The second communication module may be configured to transmit such job sharing message in response to a message requesting to share a job retrieved from the at least one second CHE. Hence, messages for job sharing will only be transmitted if requested, that is if a second communication module of a CHE indicates availability to take a job. To initiate job sharing when requested greatly increases the capacity utilization and reduces idle time of the CHE. The second communication module may alternatively instruct the first communication module to request a new list of jobs from the external instance, for example from the terminal operating system.

In this regard the expression job sharing message is not a request to perform a certain job in a strict sense, that is a CHE cannot force another CHE to perform a certain job by sending such job sharing message in the sense of the present disclosure. Rather, the decision whether to perform the job or not is made at the receiving side. From this perspective the job sharing message indicates an available job. Alternatively, the job sharing message can be send upon a request to share a job from another CHE. The message may in both cases comprise sufficient information about the job to be performed so the CHE can make a decision whether to accept the job offer or not.

The jobs to be shared can be selected based on various criteria. For instance it can be just the next job in the list of jobs to be performed. Alternatively, the second communication module is configured to select said job based on selection criteria mitigating the probability of moving through or occupying container spots to be used by one of said CHE and the at least one second CHE. For instance only jobs are shared which have source and destination outside the area the CHE is currently working in. In yet another alternative, the second communication module is configured to select said job based on the position of the at least one other CHE. Such selections criteria reduce the problem that CHEs are subsequently blocking each other and hence do not significantly increase the execution speed of the jobs. Upon successful receipt of a job sharing message an acknowledgement should be transmitted to the communication module sharing the job. The acknowledgment enables the second communication module to initiate removal of the shared job of its own job list. After successful completion of the shared job, the respective shared job is marked as completed in the job list. The list can be stored in the first and/or the second communication module and/or in a control module. The first communication module can also be configured to transmit successful completion of the shared job back to the external instance.

In case of communication failure between the CHEs or a temporary power drop, causing partial loss of power, the at least one of the configuration modules or a control module in the CHE is configured to initiate movement of said CHE to a predetermined position based in response to a failure in communication with said at least one second CHE. This avoids collision due of the CHEs.

The CHEs assigned to the same operational area can logically be combined in a work-group. In an aspect, the external instance may provide a plurality of jobs for the workgroup instead for each individual CHE. As a result, the decision which CHE shall execute a specific job in the plurality of job is made by the CHEs independent from an external instance.

Another aspect is related to a communication method between at least two CHEs operating in a determined area, wherein the area is preferably structured in rows and columns. The method comprises to retrieve a message from a terminal operating system, said message including a plurality of jobs to be performed by a first one of the at least two CHEs. The plurality of jobs can be structured in a list including their priority or order in which they have to be executed. The method according to the proposed principle comprises retrieving a job sharing request message from a second CHE of the at least two CHEs and acknowledging said job sharing request by transmitting a message to the second CHE including a job to be shared.

In another aspect, the method further comprises transmitting by the first CHE a message to a second CHE of the at least two CHEs including a position of the first CHE in the operational area. The transmission of said message is sent autonomous and independent from the retrieved messages from the terminal operating system and from any other external instance or from manual triggering. The method also comprises receiving an acknowledgment from the second CHE of the at least two CHEs in response to the transmitted message.

The communication between the CHEs enables an autonomous behaviour and job execution of the at least two CHEs within the area without external interference. The CHEs can operate in the same operational area, or in two sections thereof independent from any communication to the terminal operating system except for the reception of job lists. As a result, communication between the CHEs and communication to higher layers and external control instances are separated. Such separation can also be achieved by using different communication protocols, standards or systems for the reception and communication for job lists and the communication between the CHEs. For instance, the message from the terminal operating system is retrieved using a first communication protocol and the message and acknowledgment between the first and second CHE is utilized by a second communication protocol different from the first communication protocol.

In some protocols, communication between the CHEs is structured in such way, that each CHE gets a certain time slot, in which it can transmit a message. This approach is utilized by TDD or time division duplex based communication protocols. In such case, the at least two CHEs have to synchronize their time slots at some point to avoid communication collision or loss of messages. Alternatively or in addition, a request for subsequent transmission or a token can be broadcast prior to transmitting the message to said CHE requesting the job to be shared. Such broadcast goes to all CHEs in the same operational area. To request such token can be used in communications without fixed predetermined timeslots. The token request broadcast indicates all CHEs that a certain message is about to be transmitted and can be used to set them in some "listening" or reception mode. The token request can be broadcast in response to an evaluation about at least one position in the operational area, which will be occupied when performing a subsequent job of the plurality of jobs. As a result, the token request is broadcast, if subsequent uninterrupted execution of jobs is at stake.

This indicates the other CHEs a certain importance of the subsequent message. It can be useful in some aspect to retrieve an acknowledgment for such token request from each CHE prior to transmitting the message. This ensures that all CHEs in the same area are in listening mode and have acknowledged the request.

The message transmitted to other CHEs in the area can have various contents. For instance some messages may be of an indication type, that is for instance indicating to the other CHEs the position the first CHE of the at least two CHEs is currently working on or the current container spot position the CHE is passing through. Some specific important indicative message is the position at which the first of the at least two CHEs is about to or has entered the operational area. As all CHEs in an operational area are able to work autonomously, a so called hand-shake procedure is required to ensure that all CHEs in the same area are aware of a new CHE entering the operational area or an existing CHE leaving. Consequently, such and- shake message should also be acknowledged by each CHE, thereby informing the transmitting CHE also about all other existing CHEs in the operational area.

Other messages are of a requesting nature, these include, but are not limited to transmitting a request to leave a certain position or not to occupy a certain position over a certain period of time. The job sharing request does also belong to such type of message. Generally said, the message transmitted can be a request message from the first CHE of the at least two CHEs to the second CHE of the at least two CHEs to perform a specific task. It is suitable to transmit an acknowledgment of said request to the first CHE of the at least two CHEs.

Other aspects are related to transmitting the job sharing message to the second CHE of the at least two CHEs, said job sharing message comprising a job to be performed by said second CHE, said job being a job of the plurality of jobs to be performed by the first CHE of the at least two CHEs. The CHEs in the operational area are enabled to share jobs among themselves independently from an external instance or a manual triggering. The job sharing message may be sent upon reception of a respective request to share a job. This approach gives high flexibility as only CHEs which are able to accept a job will send a job sharing request, overall resulting in a more uniform distribution of wok and less idle time for each individual CHE. The CHE receiving a job share request message can decide in an autonomous way based on its open job list and various other criteria which job (if any) should be offered for sharing. Such criteria for example can include the position of the CHE requesting to share a job. Selection of the job can also be based upon the probability of moving through or occupying container spots to be used by the one of the CHEs. The job may be selected in such way as to mitigate the impact on the current workflow of the other CHEs in the area.

After receiving a job sharing message, the message should be acknowledged to avoid that two CHEs operate on the same job. If the job sharing message is not acknowledged, the CHE sharing the job can assume that the job has not been accepted or the message was not retrieved properly. The benefit of the autonomous job handling also enables the terminal operating system or another external instance to simply wait for a successful completion of the job without requiring such message from a specific CHE. As a result, a message indicative of a successful execution of the job in the job sharing message can be transmitted to the external instance by the CHE actually executing the job.

In the following the various embodiments presented are using different types of CHEs examples for a container handling equipment. It is understood that the disclosed principle is applicable for all kinds of container handling equipment in an operational area, which can work in a semi- or fully autonomous way.

FIG. 1 illustrates a section of a port facility in a side view schematics including a container ship 100 berthed alongside a quay 110. The ship carries a plurality of stacked containers 50, which are unloaded by a ship-to-shore crane 1A. While only a ship-to-shore CHE is illustrated in the schematics, two or more such CHEs working next to each other can be used to unload the container ship 100, depending on its length and size. Each ship-to-shore crane is configured to move along tracks (not shown) in level with quay 110 by using bogies 60 attached to the lower end of support legs 20. The bogies 60 enable the crane to move alongside the container ship 100, such it reaches each container station on containers ship 100. In case two or more ship-to-shore cranes are used, the support legs 20 of each crane can be staggered to each other that is move along different tracks. Such support legs staggering enables the cranes to partially pass until trolley crane arms 2 are proximate to each other. The ship-to-shore crane further comprises a trolley 8 and hoist 9 for grabbing, lifting and releasing a container 50. For this purpose, trolley crane arm 2 extends beyond container ship 100. The hoist 9, as explained further below grabs and locks a container 50 and lifts it off the ship. The container 50 is then transported to a temporary storage and release area 3 on quay 110 on the other side of support legs 20 for further processing. In such yard facility a plurality of further different type of cranes can operate, including and not limited to yard cranes or cantilever cranes. Some of these cranes can be immobile, while others are able to move for instances on predetermined rail tracks or freely with support of tires.

Figure 2:
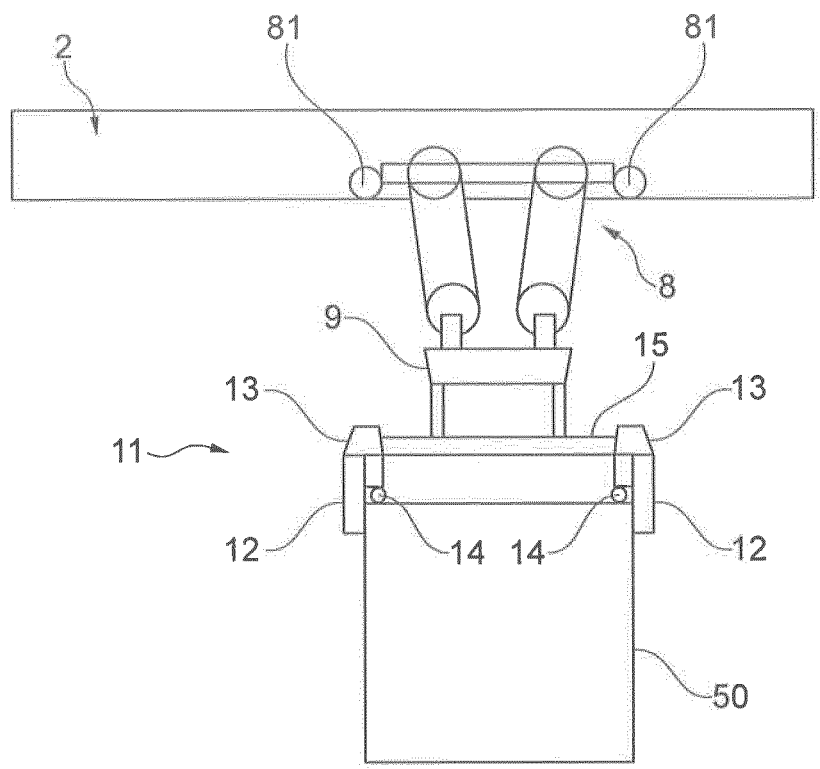
FIG. 2 discloses some details of an embodiment of a gantry crane.

FIG. 2 illustrates a more detailed schematics of a gantry crane and in particular the trolley and hoist. The gantry portion of the gantry crane is not illustrated herein. Trolley 8 is movable arranged by wheels 81 onto rails of trolley crane arm 2. A hoist 9 couples spreader 11 to trolley 8 and enables vertical movement of spreader 11. Spreader 11 comprises four twist locks 12 installed on all four corners of the spreader to grasp and hold the container. The twist locks 12 are pairwise coupled to motors 13 to lock and unlock the twist locks, respectively. Two twist lock contactors are deployed in each motor in deviation of 90° to control and identify the status of the respective twist-locks. Each twist lock contactor is assigned to a respective twist lock and identifies its position (locked/unlocked) and the status change itself. Further, the spreader comprises four landing pin contactors installed at the bottom of the spreader close to the twist locks. The contactors are arranged such as to detect the top surface of the containers, when the spreader touches the container. The pin contactors 14 can comprise proximity sensors detecting the distance between the top surface and the spreader, when the spreader is lowered towards the containers. This would not only enable the pin contactors to provide a digital signal indicating touch/no touch, but also provide a more accurate distance measurement between spreader 11 and container 50. Alternatively, landing pin contactors comprise a more simple touch sensor providing a logical value.

Figure 3:
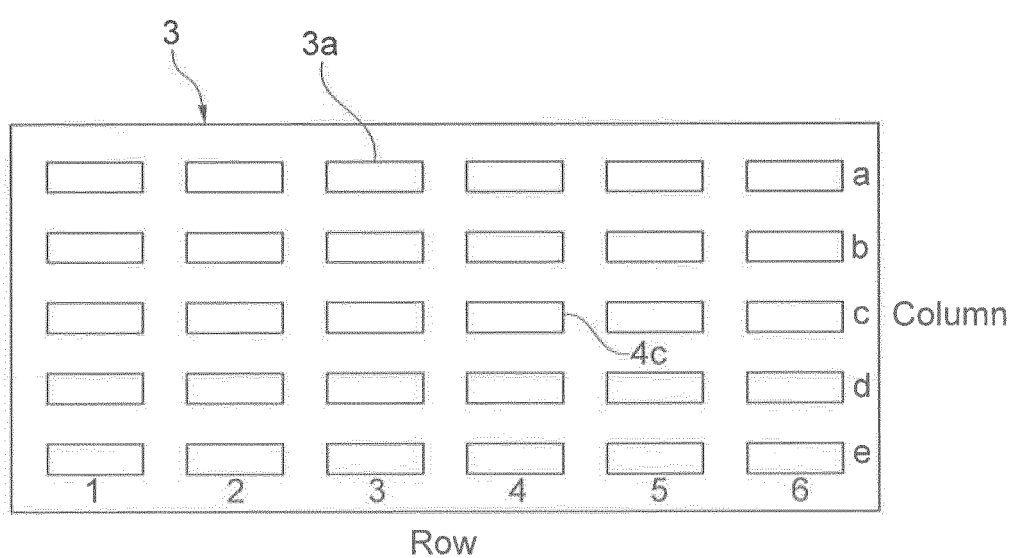
FIG. 3 shows a schematic operational area in a port or rail facility structured in a plurality of rows and columns of container spots.
Figure 3A:
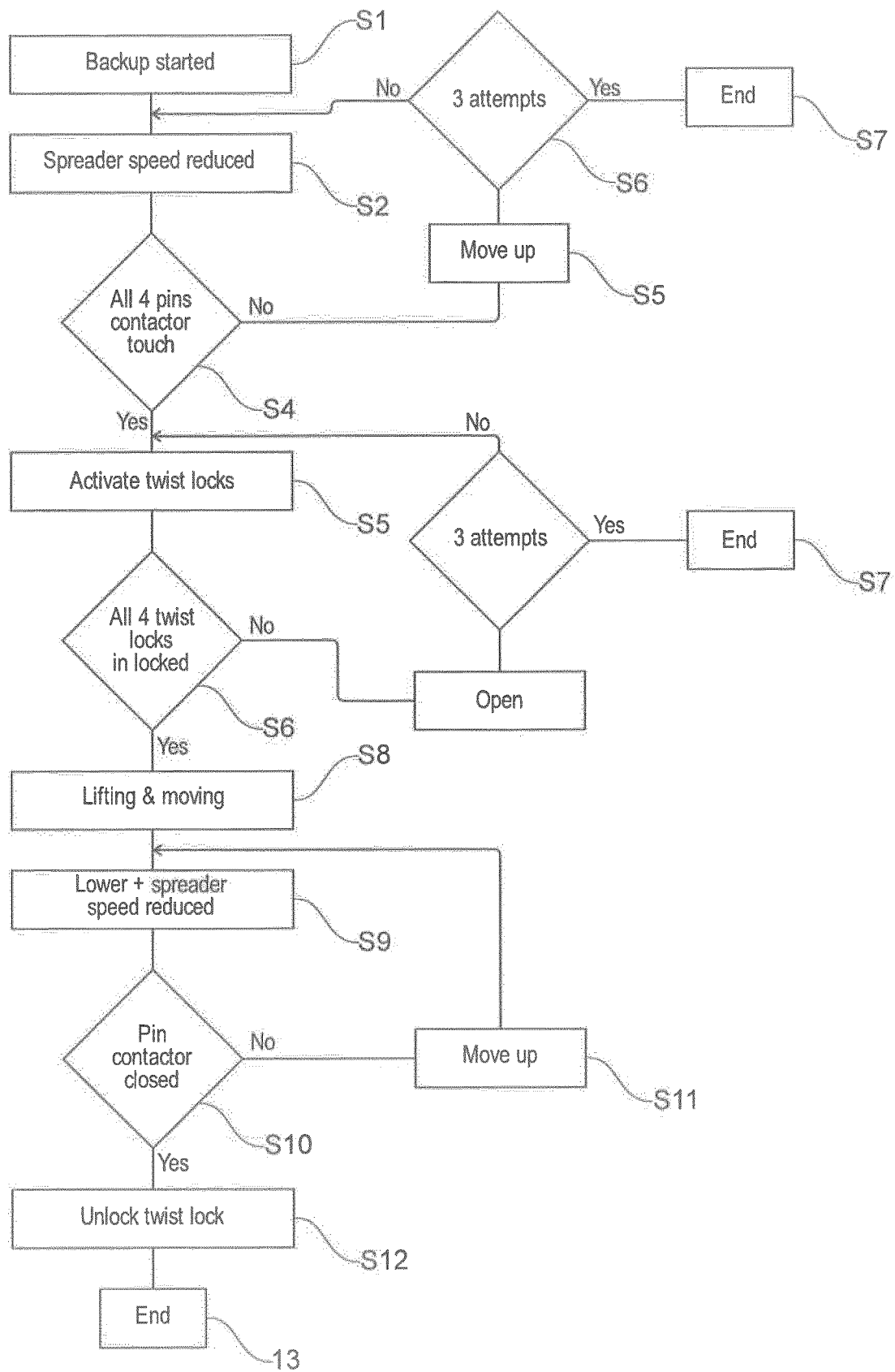
FIG. 3A shows an illustrative embodiment of method steps suited for moving a container from one spot to another using a gantry crane.

FIG. 3A illustrated the process flow for the lifting, moving and releasing procedures of a gantry crane as illustrated in FIG. 2. In step S1, the pick-up movement is initiated by moving trolley 8 and hoist 9 into position above the container to be picked up. Spreader 11 is lowered in steps S2 until either internal encoders or the landing pin contactors 14 indicated that the spreader is closing in to the top surface of the container. The lowering speed of the spreader is consequently reduced until the landing pin contactors 14 touch the top surface of container 50. Depending on the implementation of the pin contactors 14, such detection can comprise a single logical signal that is "close" or "open", but also an analogue signal indicating for instance the distance between the bottom surface of the spreader and the top surface of the container or a pressure exerted by the container.

In any case all four landing pin contactors 14 have to indicate "close" that the spreader has "touched" upon the containers as indicated in step S4. If such detection is not provided, i.e. only 2 or 3 landing pin contactors remain at "close" indicating no touch, then the spreader is lifted again and another attempt performed. The lowering procedure is cancelled in step S7 after a predetermined number of attempts in step S6 without success.

In case the pin contactors indicated a successful lowering, the process continues with step S5 by activating motors 13 to rotate the twist locks 12 grabbing container 50. Within a predetermined amount of time after activation of the motors, the twist lock contactors within the motors should change to the locked position of the respective twist lock, indicating grab of the container by said twist lock. Step S6 detects if all 4 twist lock contactors detect such locked position after the predetermined time. If this is not the case, the process continues with S6 by opening the twist locks 12 and repeating the locking and grabbing process in step S5. After a predetermined number of unsuccessful attempts have been made, the process ends with step S7, or if successful in step S6 continues with S8.

During S8, the lifting and moving procedure, the status of the landing pin contactors change to "open" status as an indicator to ensure the container has been lifted. At the same time the status of the twist lock contactors remain locked and unchanged. The hoist and trolley move the container to the target location and lowering the container again. Upon lowering the container in step S9, the 4 landing pin connectors stay in the open position status to indicate and ensure the container continues being lowered. The twist locks stay in the locked position for the time being. Depending on some encoder information the lowering speed of the spreader with the container is reduced, while the container (or the spreader) closes in onto the landing area. Upon touchdown the four landing pin contactors will change in step S10 their status from open to close, indicating that the container is firmly on ground. If one or more of the landing pin contactors 14 do not match with the others, the container is being lifted again in step S11 and another attempt is made. Only when all four landing pin contactors indicate "close", corresponding to the touchdown of the container, step S12 is performed, the twist locks 12 are unlocked and the container released. After confirmation of unlocking the twist locks, the hoist is moved up and away from the released container and the process ends with step S13.

In order to improve the detection of the landing pin contactors 14, a small space between the bottom of spreader 11 and the top surface of container 50 is maintained. Such space allows the twist locks to enter faster into the grabbing holes at the top of the container and to perform the lock and unlock operation faster. The space also enables the landing pin contactors to identify the beginning of the lift and the end of the lowering procedure.

The above procedure can be manually executed using a manual operator handling the various movements. The sensors on the twist lock, trolley and hoist present information to the operator to ensure proper handling. Alternatively various controller can be used which process positioning information from the sensors to operate the crane autonomously and are explained in greater detail below.

FIG. 3 shows an example of an operational area, in which containers unloaded from or uploaded to a container ship are temporarily stored. With regard to port facility such operational area may also be called yard. Similar areas for container handling exist in rail facilities or at airports. Depending on the size, the operational area is structured into section, and also organized into rows and columns, the intersection of each representing a container spot. The pattern of the container spot itself can vary. While FIG. 3 illustrates a regular rectangle-like pattern, in which container spots are arranged in regular columns and rows, the pattern can follow the available space on the port or other restrictions. The position of each container spot is given by the row and column number and its pattern is known to the CHEs communication or execution modules.

The operational area in the example is a single section and comprises of six rows 1) to 6) and five columns a) to e), wherein each container spot may comprise the size of a standard 20 ft or 40 ft container. The dimension for a 20 ft container are appr. 20 ft×8 ft×8 ft 6 in corresponding to 1 TEU.

Further in this example, the container spots are distanced from each other, enabling to place other size containers on these spots. In alternative embodiments, the operational area can have more rows and columns, for instance an operational area can comprise up to 90 rows and 20 columns. Such larger areas can be divided into smaller sections as explained in greater detail below. Container spots are often proximate to each other with nominal no space between. These kinds of areas are often used for standard containers, in which the size is predetermined and no air circulation is required. Space between containers require more space, but provide a higher flexibility when placing containers of different sizes, and may be suitable for reefer containers or other types of containers requiring ventilation.

Figure 4:
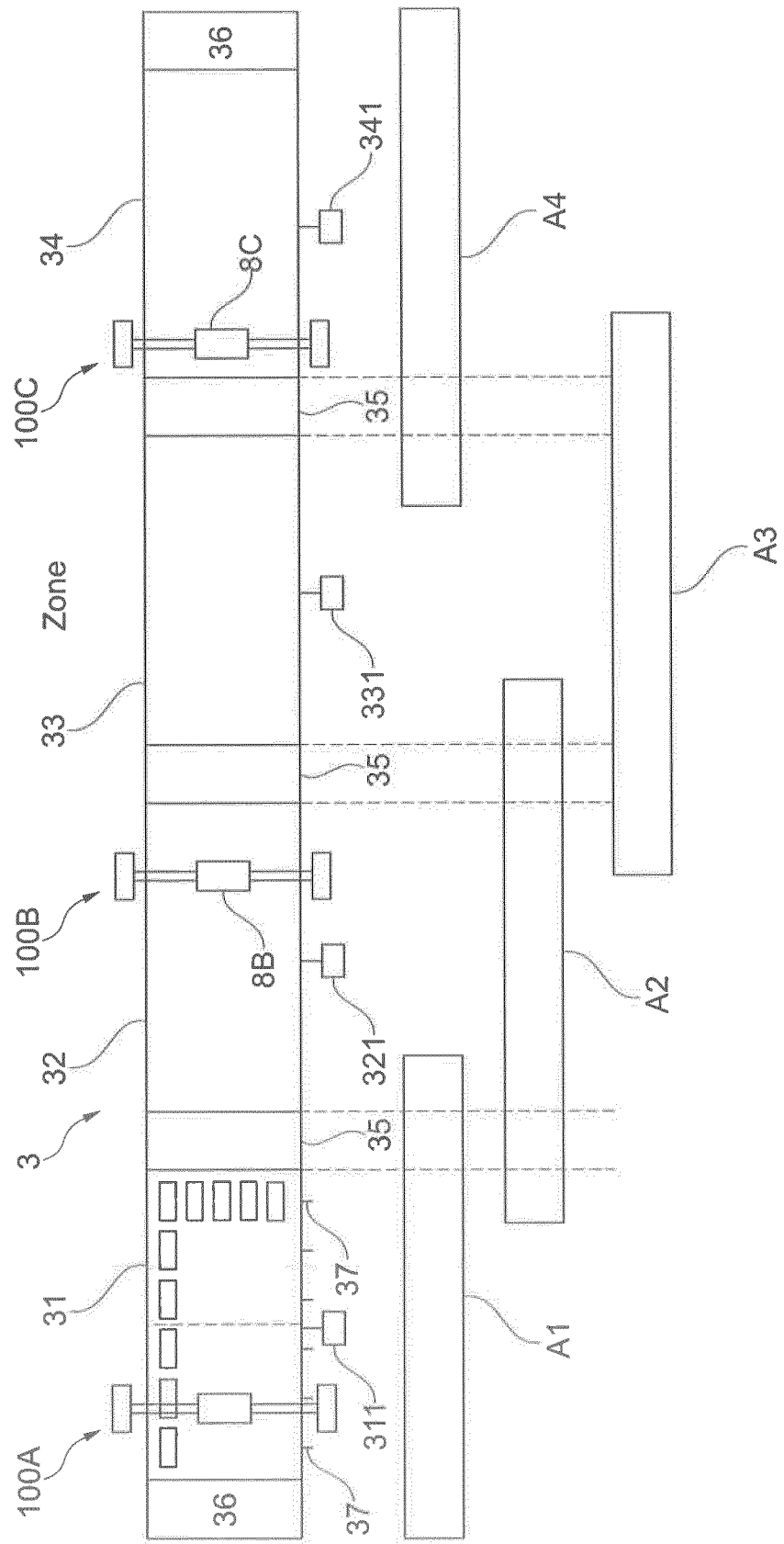
FIG. 4 discloses another illustrative operation area with several sub-blocks, in which several CHEs are operating.

FIG. 4 shows an example of an operational area 3 comprising several sections 31 to 34 arranged next to each other. Each section comprises a plurality of container spots arranged at the intersections of rows and columns, respectively. A safety space 35 is arranged between each section 31 to 34 of operational area 3. At the respective end sections base areas 36 are provided. The area 3 is operated and supported by three gantry cranes 100A, 100B and 100C in accordance with some aspects of the present disclosure.

Each crane is communicating with a terminal operating system TOS either via wired or wireless communication. The TOS provides a list of jobs to be performed based on several parameters to each crane. For this purpose, the operational area 3 in its section is divided into four, partly overlapping operating sections A1 to A4. Each crane is assigned to at least one of those operating areas. In the present example, crane 100A is assigned to section A1, crane 100C is assigned to operating section A4 and crane 100B is assigned to two sections, namely A2 and A3. The job list provided by the TOS to each of the crane contains preferably jobs located in the respective section to which the crane is assigned to. For instance, the job list of crane 100A contains jobs whose source and destination lies in operating area A1. Similar job lists are provided for cranes 100B and 100C by the TOS. While the TOS may assign the jobs to be performed to each crane in such a way that it reduces the risk of collisions, a situation may occur in which source or destination is locate in one of the overlapping parts of the operating sections. For instance a job for crane 100A contains a destination in section 32, but still on operational section 32. Depending on the job execution of crane 100B a situation may occur in which the destination position of the job for crane 100A is occupied by crane 100B. As a result, either the first crane 100A has to wait, for instance in area 35, until the second crane has finished (at least) its current job or second crane 100B has to move out of the way.

Despite the time consuming factor of such solutions, it requires an increased awareness and communication between the crane operators to avoid collisions in such rapid moving environment. In the proximate future, cranes operating on port or rail facilities may become more and more autonomous and perform jobs without the need of interference by a manual operator. As a consequence, logic and decision making processes are transferred either from the operator to the cranes logic or from the TOS into the cranes logic to enable the cranes to perform certain jobs independently.

The present disclosure proposes several aspects around the interaction and communication for autonomous or semi-autonomous cranes in a port facility environment. As each port facility environment is different, it is understood that the presented aspects can be combined or modified in different ways and are not restricted to the disclosed exemplary embodiments.

Referring back to FIG. 4, each section 31 to 34 comprises a special location denoted as 311, 321, 331 and 341. At those positions, the gantry crane locates and confirms its position and communicates its position to the other cranes, as explained further below. In the example, the special location is in the middle of respective physical section 31 to 34 of the operational area, and not necessarily in the operation sections A1 to A4.

Figure 5:
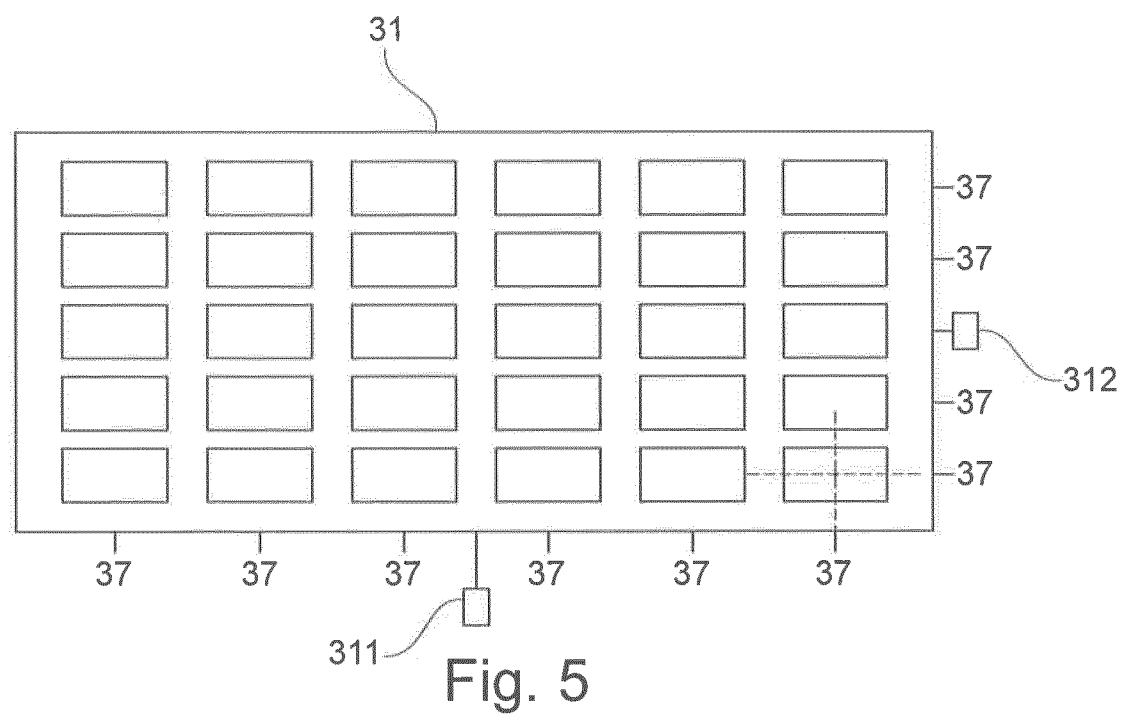
FIG. 5 illustrates a detailed view of one of the sub-blocks of FIG. 4.

Each section comprises also a plurality of (depending on the implementation virtual) markers 37, which enable each gantry crane 100A to 100C to reconfirm its exact position among the operational area. The markers 37 as the special locations 311, 321, 331 and 341 alike can comprise simple colored lines on the ground, detectable by a camera or a visual sensor, but also other means, like for instance light barriers, inductive or magnetic barrier or the like. Passing or reaching one of the markers 37 or the special location indicates the gantry crane its exact position among the area. In suitable embodiments the container spots on each section 31 to 34 are aligned with those markers. In an alternative embodiment, the markers 37 are obtained by information about the distance the gantry crane moved from a well-known position. Such information can be obtained by velocity or speed sensors arranged at the gantry motors 60 illustrated in FIG. 1 or by encoders using the known ratio between encoding steps and size of the gantry wheels or encoding steps and turns of the motor 60. For locating the position between the markers, the gantry crane may use the same principles as described above. In an embodiment, communicating the position between the cranes takes place when a crane passes one of the special locations 311, 321, 331 and 341. Alternatively, communication between the cranes about their respective positions can occur multiple times, and particular at each of the markers 37. FIG. 5 shows a more detailed view of section 31 of an operational area. While gantry crane movement repositions the crane among the rows, trolley movement can select a respective column to identify a specific container spot. For this purpose, a special location 312 is defined, upon which the trolley confirms its location. Likewise for rows the columns of each section are indicated by corresponding markers. The marker position is defined by the relative distance between special location 312 and definition of container spot size and distance between the container spots. It is obtained using distance measurement techniques, like for instance decoding the motor steps for moving the trolley. A plurality of additional markers can be defined for the row and the column directions until a suitable resolution of position location.

Figure 6:
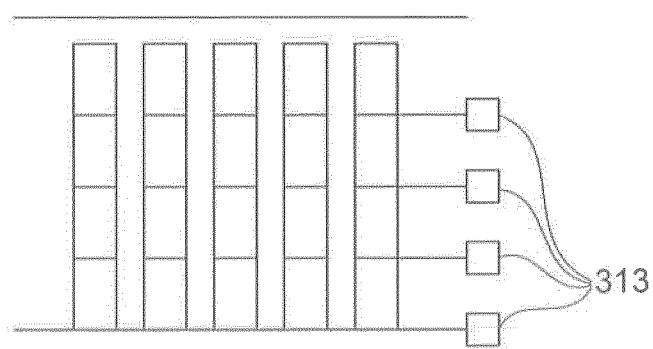
FIG. 6 shows an embodiment of staked containers and their position in one of the sub-block according to the embodiment of FIG. 4.

FIG. 6 illustrates the stacking of containers within a section of the operational area performed by the hoist. Similar to the rows and the columns, there are predefined locations 313 indicating the level of the surface upon which a container can be placed. The lowest level or tier, called tier 1 is the ground surface itself. The largest tier in this embodiment is given by the top surface of the topmost container upon which no other container can be placed. The distance of the spreader towards a certain tier or the position of the spreader as such is controlled by the cable of the hoist. In this embodiment the tier is given by the top surface of the containers enabling the hoist to stack containers upon each other. An instruction to lift the topmost container in the example of FIG. 6 results in moving the hoist to the respective column and row position and then lower the spreader to a level given by the respective tier including the height of the container. Further level markers (not illustrated) can be used to selectively adjust the speed when lowering or lifting a container. By such approach accidental damage to a neighboring container when lowering of lifting a container can be avoided.

The container spots defined by row and column together with the level indication represent a 3-dimensional coordinate system providing either source (where to retrieve a container) or destination position for the gantry crane. Occupation of each individual container spot in the area is maintained in a database. In addition to simple information related to occupation of containers spots, full container detail information, i.e. content, weight, delivery information etc is maintained as well. The database is at least coupled to the TOS or forms a part thereof. Some of these information, particularly all information relevant to handling the containers can also be stored locally on the CHE in a respective file or local database as well. Such file or local database is then updated by the TOS.

Figure 7:
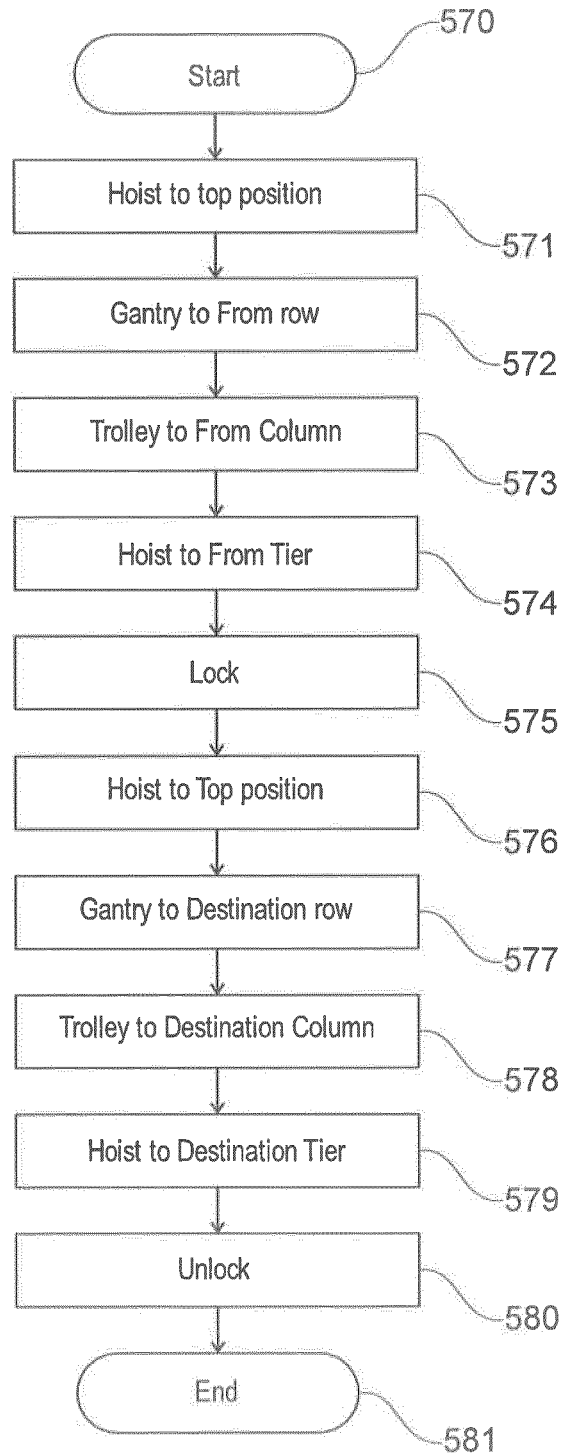
FIG. 7 illustrates exemplary method steps of performing a container movement job for a gantry train.

FIG. 7 illustrates a general process for executing a job by a gantry crane that basically comprises steps of moving a container from a source position to a destination position. Starting from FIG. 4, the gantry cranes are positioned on a base positon, that is either on the left or right end section of base area 36 or in one of the safety spaces 35. In step 571 the hoist is moved upwards if it is not in such position already. The top positon of the hoist avoids an accidental collision into a stacked container within the operational area. In step 572 the gantry crane is moved along the sections of the area until it reaches the specified source row. At the same time or after the gantry crane has reached the row position the trolley is moved to the specified column position. The spreader is then lowered in step 574 to a level corresponding to the respective tier including the expected height of the container (using the definition of tiers in FIG. 4). After confirmation that the spreader has reached the top surface of the container to be lifted, as outlined in FIG. 2, the method continues with step 575, locking the container and lifting it up in step 576. Again the spreader is moved to the top position to prevent collision of the lifted container with neighboring containers in the operational area. In step 577 the crane is move to the destination row and the trolley moved to the destination column. The spreader is then lowered in step 579 until it reaches a level corresponding to the destination tier and the height of the container. By then the bottom surface of the lifted container touches the top surface. When placement of the container firmly on the ground or on another container is confirmed (corresponding to step 10 in FIG. 3A) the container is unlocked in step 580 and the process ends.

While the process of FIG. 7 works fine with a single crane, there is a risk of collisions if two or more cranes work in the same operational area. Such risk occurs when a first crane performs a job requiring it to move to a space occupied by a second crane or to a space located beyond the second crane such that the first crane has to pass the second crane. Referring back to FIG. 4 a total of three cranes 100A to 100C are working in the area and its sections. An example of a potential collision situation is present when crane 100A is performing a job requiring it to move a container from the first sub-block to the third sub-block, while crane 100B is re-arranging several containers in the second sub-block. In the case in which the cranes are assigned to one or more of the operational sections A1 to A4, similar situations can occur as described above.

For the purpose of avoiding collisions in a semi- or fully-autonomous environment, the cranes communicate with each other. Such communication can be a wired communication or a wireless communication. In an aspect, the communication between the cranes utilizes a communication link or communication protocol different from the one for communication with the TOS. Such approach enables the cranes to establish and maintain communication as well as continue to perform jobs even when the communication to the TOS fails or is unreliable. Communication between the cranes is robust, simple and error-insensitive to ensure communication even in changing and/or harsh conditions. To avoid communication collisions, the communication may be based on a TDD system, in which each crane has a dedicated timeslot to communicate. Alternatively, communication is token based, in which communication is structured more hierarchal and certain messages can only be sent if the crane requests and subsequently retrieves the token.

The communication between CHEs occurs without interference from other top layer systems, like for instance the TOS. As illustrated in FIG. 4, three different cranes or CHEs are occupying operational area 3. To ensure an efficient and collision avoiding job performance, the CHEs, or more particular their respective communication modules communicate with each other using certain commands, each of the commands informing the other CHEs about a specific status or a certain request. These commands comprise request transmission and acknowledgment transmission only, wherein the nature of the message is distinguished by the first letter transmitted, that is "S" for a request and "A" for acknowledgment. They can include at least one of the following, but are neither restricted to all of them nor limited to the ones mentioned:

Token broadcast
  Depending on the communication protocol to be used, the gantry CHEs in a certain operational area do not regularly communicate with each other, but only when required. To avoid communication collision, that is messages are sent at the same time on the same frequencies, so called tokens are introduced and a CHE can only send a request if it has a token. To retrieve a token, a CHE requests a token by broadcasting a simple message like:

SRT#<CHEID>
  The CHE which currently has the token can release the token by acknowledging the request, like for instance ART#<CHEID><Status>, wherein status indicates release or not release of the token.
  The same acknowledgment may be sent by other CHEs in the area. The token release message may also be used by the other CHEs to prepare themselves for a subsequent request message by the CHE requesting the token and can therefore support an efficient communication. In case a token request is broadcast and no response is retrieved within a predetermined amount of time, the request is repeated a couple of times. Upon continuous failure, the communication is considered to be faulty and a manual operator is contacted or report created.

Handshake
  Each time a CHE changes its section position, i.e. entering or leaving the operational area (or one of its operational sections) it may send a hand shaking message to all other CHEs working in said area. In case the CHE is joining the area or a section thereof or leaving the section, the exact position is shared with the other CHEs. Such message can have the following logical format:

SHS#<BlockID>#<CHEID>#<Status>#<Position>.
  The other CHEs conform receipt by sending an acknowledgment message, like AHS#<BlockID>#<CHEID>#<Position>
  In the above response the CHE acknowledging the receipt re-transmits the BlockID and the position of the CHE changing its position. The retransmission can act as a confirmation, that transmission was in order and no error occurred during transmission.
  In an alternative response the other CHEs may acknowledge receipt of the message and also transmit their respective positions, like for instance AHS#<BlockID>#<CHEID>#<Position>#<CHEID2>#<Position of CHEID2>
  While the above message may simplify handshake communication and reduce the amount of messages to be sent for handshake, it mixes between information or request messages and pure acknowledgment messages. Using the handshake ensures all CHEs in a specified operational area are aware of each other. In case of a reset, for instance due to power failure, it is suitable to repeat the handshake sequence for all CHEs in the area.

Movement communication
  As illustrated in FIG. 4 the several markers 37 in each sub-block are aligned with the container spots. These markers are used by the gantry CHE to identify its position in the sub-block. Further, the markers can be used as a trigger to update the position to all other CHEs working in the area, enabling all other CHEs to calculate their distance or position relative to the one transmitting its position. As in the previous handshake scenario, the other CHEs acknowledge the receipt of the message. For example the format to update the gantry position at those markers may comprise the following format:

SG P#<CHEID>#<PositionIndex>
and the respective acknowledgment may look like
AG P#<CHEID>#<PositionIndex>
  Despite transmitting the gantry position, at which the gantry CHE performs a certain job, it can be suitable to inform all CHEs of the movement as such. When a CHE moves through a certain position, for example through a certain marker, it may inform the other CHEs with the following message:
SCP#<CHEID>#<CHEID>

Space communication

In order to enable an efficient work progress and quick job performance, the CHEs can also inform each other about the target of their respective movement in order to reserve a certain working space for the next job. This may enable the other CHEs to adjust the actual movement to avoid a situation in which they have to pass each other. Transmitting the target position allows a gantry CHE to deliver a container to its destination without interference from other CHEs. The target position corresponding for example to one of the markers 37 in FIG. 4 is acknowledged by the other CHEs.

The messages may comprise the following structure:

STP#<CHEID>#<Target Position>
ATP#<CHEID>#<Target Position>

In addition or as an alternative to target reservation, the gantry CHEs can request to release or share a certain area in the operational area currently occupied by another CHE. Such communication is useful in case the job to be performed has a destination at a sub-block which may require another CHE to move to an exchange area to the requesting CHE to complete its job. As the position of the CHEs in the operational area are known to each other, such message may only be transmitted if the destination is occupied or blocked by another CHE. Consequently, the message can be directed to a specific CHE, the one currently occupying or blocking the destination or generally to all CHEs in the area. Each CHE has then to decide for itself, whether it is affected of the request and if so, whether it is able to release the requested area. The format of such request message may look like
SRS#<CHEID>#<Target Position>
and the acknowledgment message can have the following format:
ARS#<responding CHEID>#<Status>#<current Position>
wherein Status is negative if the CHE occupying or blocking the requested space is currently working. In such case the requesting CHE has to wait for a predetermined amount of time and then repeat its request.

Job sharing communication

The terminal operating system, TOS creates and provides a list of jobs to each CHE in a predetermined order to execute. Depending on the circumstances those list may comprise a different length or complexity, such that a CHE in the operational area may be finished with its job list while other CHEs are still executing jobs. The CHE just becoming idle can now report back to the TOS that all jobs are finished and request a new list of jobs. As an alternative, the CHE can request from the other CHEs also working in the operational area to share a job from their respective lists. The concept of job sharing is useful in circumstances in which new job lists are dependent on the successful completion of previous jobs. As all CHEs are working in the operational, such approach can increase the overall execution speed, particularly when the CHEs are organized in workgroups and one CHE in such workgroup has not finished its list.

An idle CHE can transmit a request to share a job to the other CHEs in the area, wherein PositionIndex is its position in the area
SJSJ#<CHEID>#<PositionIndex>

Upon reception of such request, the CHEs with open jobs available determine the availability to share a job. The evaluation depends on various criteria as explained further below and either results in an acknowledging message that no job is available:
AJS#<CHEID>#<Status>
with Status equals "NO job". The idle CHE may repeat its request message after a predetermined amount of time or upon successive failure report back to the TOS. In case a job is available, an acknowledgment together with the respective job information is transmitted:

AJS#<CHEID>#<Status>#<PositionIndex>#<ContainerID>#<SourcePosition>#<DestinationPosition>

Upon reception of the above message, the CHE requesting the job sharing adds the job in the message to its job list and executes the instructions therein. In order to ensure that such job sharing message is retrieved, it is suitable to re-acknowledge receipt of the job sharing message by the CHE requesting the job sharing in the first place. Only then may the CHE sending the job sharing message remove the now shared job from its own job list, because otherwise the job may be lost and not executed resulting in undesired delay at a later time.

It is suitable to send a job sharing message upon request and not as an initial message. The request and response approach reduce the communication between the CHEs related to job sharing and ensure that only CHEs being idle and capable of taking on a job are request job sharing.

Figure 8:
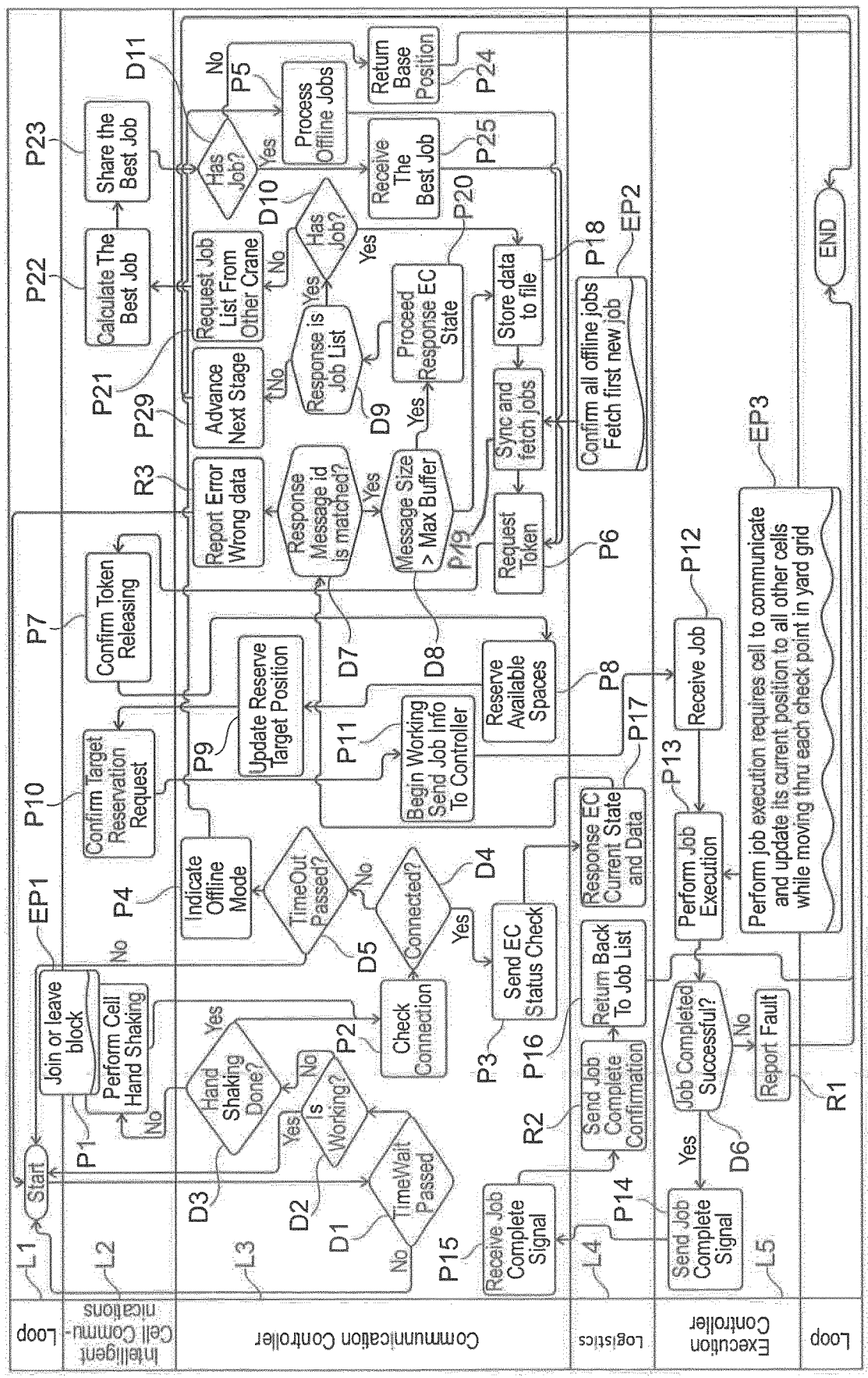
FIG. 8 shows an embodiment for a master process illustrating various steps performed by different modules in a CHE.

FIG. 8 shows the process flow of a master flow chart for two or more CHEs operating in an operational area using the two communication modules in accordance with the proposed principle. The master process illustrated describes how CHEs are working with an external system to retrieve its jobs and control the execution of the jobs after string a list of jobs in a memory. In case communication to the external instances fails or the CHEs become (temporarily) off-line, they can continue performing jobs. The master process further describes how to synchronize jobs from offline to online and share jobs with other CHEs while working in the same area.

The master process is structured into several logical swim-lanes, wherein the steps and evaluations in lane L3 and L5 are implemented in different hardware in this example. The steps and evaluation in Lane L3 are performed by a communication controller, which includes the first and second communication module to communicate with the TOS on lane L5 or other CHEs in the operational area in Lane L2, the intelligent cell communication. In this regard the expression cell refers to a CHE in the operational area. The process itself is looped and can be stopped or triggered by other external processes, some of which are named herein as EP1 to EP3.

Explaining now the various steps and evaluation points in the lanes in greater detail. Starting from the top loop and the starting point, the communication controller waits a predetermined amount of time in D1 and then evaluates in D2 if it is working and executing jobs. If that is the case the loop begins anew. If not, the communication controller evaluates if the hand-shake procedure has been conducted in this particular section of the area or the area itself has been conducted. Depending on the evaluation result, the communication controller initiates to perform the cell Handshaking procedure P1 as described above by transmitting a respective message to all CHEs in the vicinity. The same procedure P1 is also initiated from external process EP1, when the CHE enters (or leaves) the respective operational area.

After the handshake procedure is done or if the evaluation of D3 indicate that a handshake already occurred, the master process continues with evaluation of steps P2 and D4, namely to monitor the communication connection. If the CHEs is online and has a connection to the external instance, the EC status check is transmitted in P3 by the communication controller to the external instance on the equipment control network logistic lane, denoted as Logistics. If the evaluation in step D4 is negative, the process continues after evaluation of a timeout in D5 to indicate the off-line mode in step P4. The offline mode initiates to process jobs offline P5, including either to continue working on their own job list or request to share a job.

For this purpose, the communication controller in the illustrated master process initiates to send a request token message in step P6 to all other CHEs in the area. The intelligent cell communication confirms (either instantly, after some time or after some repeated token requests) the request in P7, thereby enabling the communication controller in step P8 to first identify and reserve the spaces needed in P8 and subsequently update the reserve target position by sending a corresponding request message to reserve certain positions in P9. The request is confirmed and acknowledged in step P10 within intelligent cell communication lane. After confirmation of the reserved space the communication controller can start sending the respective job information to the execution controller. Until this point decision making and evaluation took place within the communication functionality of a CHE.

The job is retrieved by the execution controller, which in turn performs the job execution in step P13. During job execution the execution controller does not only control and monitor the various functions of the gantry CHE, e.g. gantry, hoist and trolley movement, but also secures that respective proper information is sent via the communication controller to the other CHEs in the operational area. Several external processes EP3 are supporting the job execution. In case communication with other CHEs cannot be maintained or established during execution of a job, the communication controller informs the execution controller about such incident and the execution controller interrupts execution until the incident is solved. The execution controller finally evaluates, whether the job has been successfully completed in D6. If this is not the case the execution controller reports R1 a fault report to the communication controller and subsequently to instances in the logistics lane. In case of a successful completion a respective positive status signal is sent to and retrieved by the communication controller in steps P14 and P15, respectively. The job completion is then forwarded as a report R2 by the communication controller to the logistics lane and the master process terminates after returning back to the job list in step P16

Referring now back to steps D4 and P3. After sending the equipment control status check, the higher instance within the logistics lane respond to the EC status and also sends data, P17. The message is retrieved by the communication controller and evaluated in step D7, whether the response ID is matched. If the evaluation returns a negative status, indicating no matching the communication controller submits a error report indicating wrong data and the whole loop is repeated. If the responseID is matched, the message size will be evaluated in D8. In case the message size does not exceed a certain buffer size, it is assumed that the message contains a job list, which is then stored to an internal non-volatile memory in step P18. The stored data is synchronized and a job to be processed is fetched in step P19. After fetching a job, the master process continues with step P6 as described above.

Referring back to D8 in the case the message size exceeds the buffer. The process then continues with processing the response equipment control state and evaluates in D9 if the response retrieved in D7 by the communication controller is a job list. If the response is not a job list, the process ends after advancing to the next stage. Otherwise the process continues with a subsequent evaluation in D10 to determine if the jobs in the list are executable at this time. If such is the case the jobs are stores in the non-volatile memory in step P18 The job list could also contain jobs which need to be executed in the future and are not yet available. Then the evaluation becomes negative.

If the evaluation in D10 is negative, the CHE is considered to be idle and the communication controller can initiate the job sharing request. For this purpose the master process continues with step P21, in which the communication module sends a job sharing request to all other CHEs operating in the same area. As discussed previously, such job sharing message can be preceded by a request token broadcast. The other CHEs receive the job sharing request and evaluate the possibility to share a job. Such evaluation does not only include to identify a potential job to be shared (e.g. the next available job in their respective job lists), but also calculate the best job available.

Such calculation made by one of the other CHEs takes into account the next coming jobs in its respective job list to determine whether there are any jobs outside its own working section and nearby the CHE requesting the job sharing. If there is a job available, the distance between its current position and the position stated in the job to be shared is calculated to determine the likelihood of clashing when the job is shared. In this regard, one can calculate the distance from its current position to the starting position or to the destination position. It is suitable for the calculation to evaluate both positions to determine a potential conflict. The calculation above can be made for each available job and then the job with the lowest impact is selected. Alternatively, a job is only selected if the distance or a value indicative thereof reaches a certain threshold. For instance only jobs with a source less than a certain distance away from the CHE requesting the job sharing are selected and then the distance is calculated for those jobs to identify to most suitable one. These calculations ensure that only those jobs are shared (or offered), which do not generate a position conflict when executing the respective jobs. Further, only jobs close to the proximity of the CHE requesting a job are selected for sharing reducing the risk that the CHEs gets in conflict with yet another CHE operating in the same area.

Once the evaluation is completed in step P22, the other CHE responds in step P23 and either indicates no job is available or transmits the respective job information. The message is acknowledged and evaluated. If there is no job confirmed by any CHE in step P23, the communication controller initiates movement of the CHE to a base positon or initial working area in P24 to prevent deadlock and avoid standing in another CHE's way or occupying a location. The expression base position may correspond to a specific location in the operating area, i.e. a transfer point and the like. Alternatively the base position may correspond to the position of the last job which was executed by the CHE. The CHE would then move to such position and wait until the path is free. In case the working range is unknown, as it may be available only to an external instance, return to base point is required. If a job has been transmitted, the job is extracted in step P25 and the communication controller continues with requesting a token as described in steps P6 onward.

Figure 9:
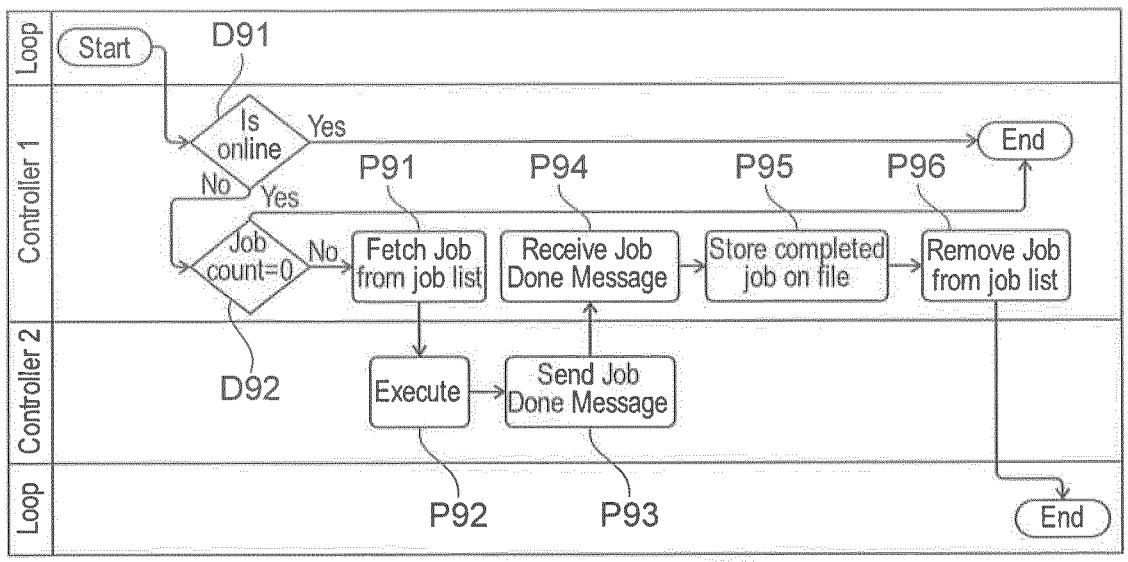
FIG. 9 shows a more detailed view of one or more steps performed in the above master process.

FIG. 9 illustrates some further aspects related to step P5 and the process of off-line jobs of the master process shown in FIG. 8. As discussed with respect to FIG. 8 the communication controller determines the availability of external instance, particularly to the TOS or any other instance providing at least one list of jobs to be performed. Such evaluation is abbreviated here with reference D91. In case the gantry CHE is online and communication can be established, the process continues as described with respect to FIG. 8. If communication is not available, the communication controller assumes the gantry CHE to be off-line and then continues with evaluation in D91 to check if there are jobs available. It this is not the case, the process exits again and continues within the master process, namely to either request job sharing or returning the gantry CHE to a safe position. If there are still jobs in its internal job-list available, the process continues with step P91 to fetch a job from the job list. This part corresponds to the tasks taken in P19, EP2, P6 and other, wherein the job is fetched from the job list and the other CHEs are informed about the reservation of destination and/or source position. The execution is done in accordance with step P13 of the master process. The communication controller informs the execution controller about the positons of gantry, trolley and hoist, both for source and destination. The execution controller is responsible for monitoring the current positions and executing the respective job. As discussed previously, communication with other CHEs in the operating area ensure that the path is not blocked and collisions are avoided. After completion of a job (successful or not), a respective message is forwarded from the execution controller and received by the communication controller in steps P93 and P94, respectively. As communication with the TOS or other functionality of the logistics lane is not established and the CHE is operating off-line, the communication controller stores the information about the completed job in a non-volatile memory and removes the job from the list of jobs to be performed. Once the communication is re-established, the communication controller can forward the list of completed jobs to the TOS or any other instance and hence keep the external instance up-to-date. The execution of jobs continues until completion of all jobs in the job list.

The above approach enables the CHEs in the area to continue operation even when communication with the TOS or other systems in the higher levels of the facility architecture is only temporarily available. As a result, fault tolerance to logistical operations is significantly improved.

Figure 10:
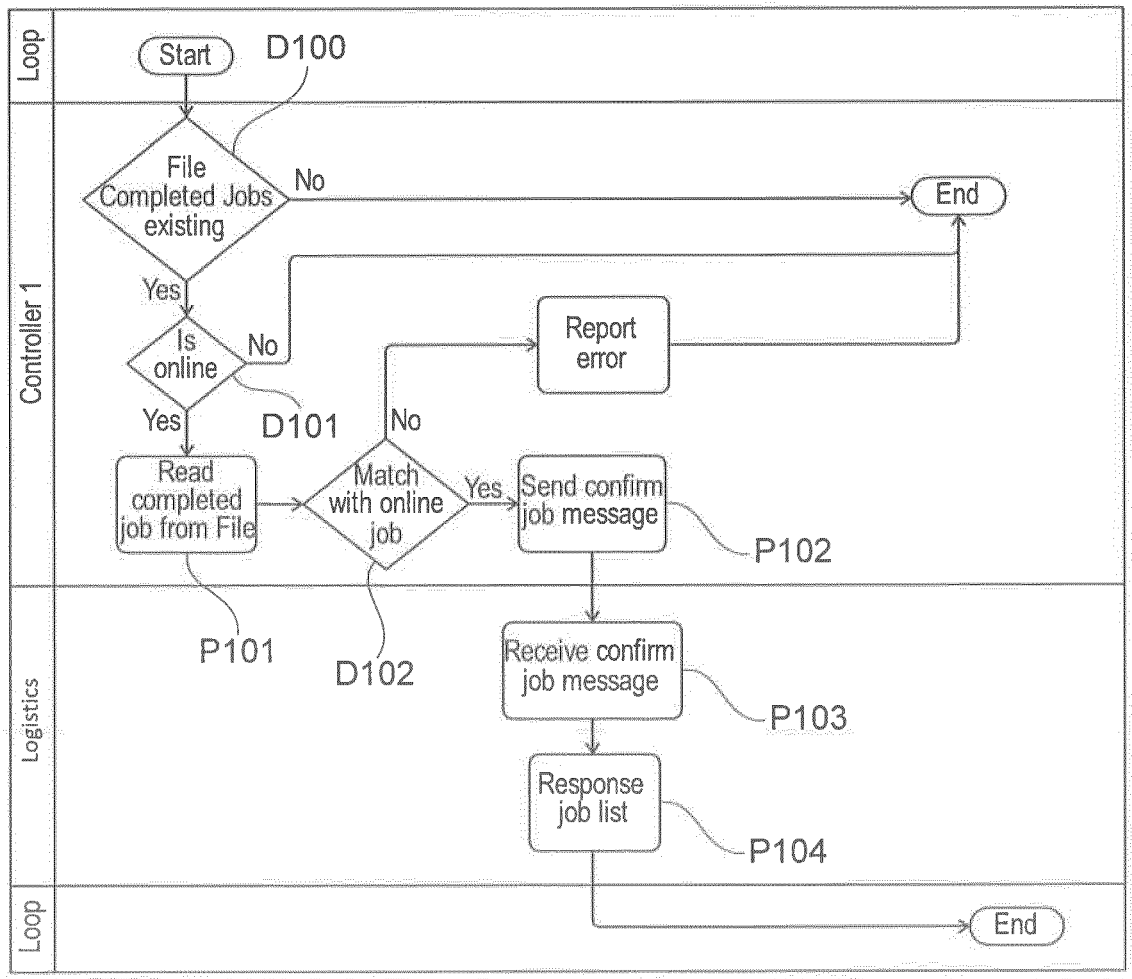
FIG. 10 illustrates a more detailed view of other aspects performed in the above master process.

FIG. 10 in this regard shows another process related to synchronizing and fetching a job. Synchronizing and fetching jobs is initiated in accordance with the master process in FIG. 8 in step P19, when communication is re-established. Consequently, information about finished jobs is exchanged between the communication controller in a CHE and the TOS or other external instance in the logistics lane. In a first evaluation step D100, the communication controller evaluate if there are at all any completed jobs existing which have not yet been reported. Only if this is the case, it is determined if communication is established, that is if the CHE is on-line. In a subsequent step P101, a first job marked as completed is read and evaluated if there is a match with a corresponding job provided by the TOS job list in D102. An error report is created when the job completed does not have a matching job in the online job list by the TOS. Otherwise, the communication controller sends a confirm job message to the TOS in the logistics layer. While only one completed job is read in the above example, the synchronization may actually be repeated in a loop, until all jobs marked as completed are sent to the TOS. The completed job list should then be empty.

Figure 12:
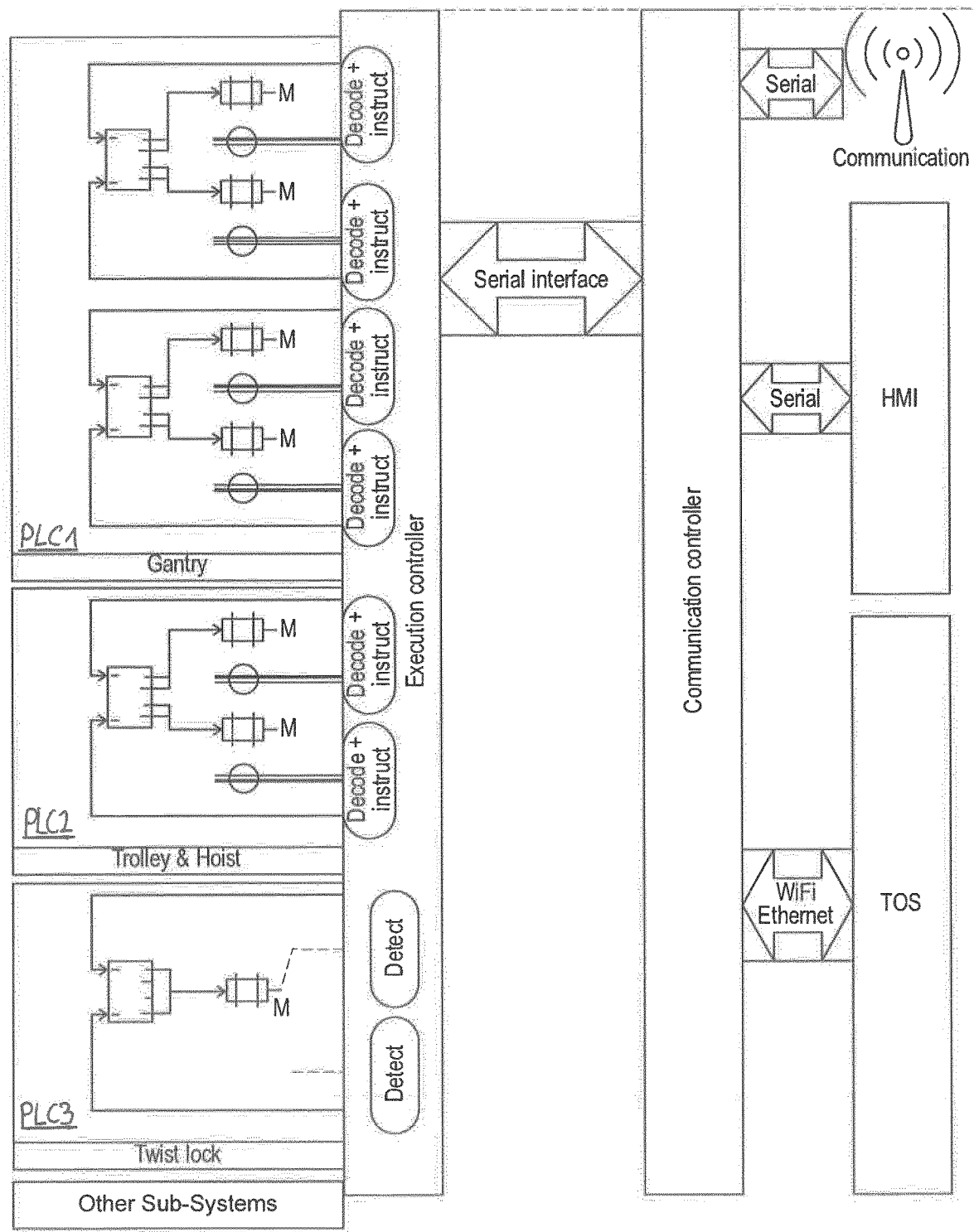
FIG. 12 shows an embodiment of a control arrangement for CHE according to the proposed principle.

FIG. 12 shows a logic diagram with the interconnection of the different components in a gantry crane. The crane's functional components can be divided into three major parts that is PLC logic configured to control and drive the different mechanical parts in the crane. PLC logic PLC1 controls the gantry portion of the crane, PLC logic PLC2 is responsible for controlling trolley and hoist and finally PLC3 in this example controls and monitors the twist lock system, grabbing the container. The PLC controller, sensors and the like are coupled to an execution controller which may be regarded as one of the central elements in accordance with the present proposal. The execution controller processes all signals from and to the different PLC units. It controls the movement of the gantry crane. For this purpose, the execution controller is coupled to a plurality of sensors to locate its positon within the operational area and calculate the distance and direction to its target. The execution controller is coupled via a first interface to a communication controller to receive high level instruction from said controller. The interface is in this exemplary embodiment implemented as a standard serial interface, simplifying a coupling between the execution controller and the communication controller. In this regard, already existing interfaces can be re-used as the instruction from the communication controller to the execution controller may be standardized.

The communication controller is responsible for communication with all higher and external instances and for organizing and controlling the job lists. It contains non-volatile memory, not shown, in which the list/lists of jobs to be performed is/are stored as well as a list/lists of completed jobs. In addition to job information, the memory is also used to store a logical map of the operating area as well as location markers of the respective container blocks thereof. The communication controller as well as the execution controller, is able to retrieve such information form the memory in order to identify source or destination position of containers. Together with information about the current position (obtained by GPS or local markers), the controller may "know" where they are in relation to a specific location or position in the operating area. Further information in the memory can be related to container specific properties, like container contend, weight, delivery or source information time steps and the like. Obtaining such information, updating them when working in the operating area and synchronizing such information with the external logistics system/TOS may reduce handling errors, which can happen during manual operation of the CHE.

The communication controller is able to evaluate the communication link and quality. The controller is configured to communicate via a first interface to higher instances, for example to the terminal operating system. Such communication uses a predetermined protocol, for instance a wireless protocol, like WLAN. It is possible to use normal telecommunication protocols or the telecommunication network to establish communication between the TOS and the communication controller of the respective crane. The communication to the TOS is related to logistical operation in the working area that is in particular the job instructions, which need to be performed and their respective order. Successful executed jobs are reported back, when respective information is retrieved from the execution controller.

The communication controller also includes a second interface to the HMI that is a machine-human interface, for instance a monitor screen and operator terminal and the like. The communication controller provides different and/or selectable information via the second interface to an operator of the crane. This information includes for instance the job description and the status of the crane, gantry, hoist, trolley and twist lock. The HMI may also present to an operator a virtual map of the operating area including the container spot or other landmarks to support him in tis orientation. In addition, the HMI is configured to accept operator input and forwards that input to the communication controller.

The communication controller is further coupled to a radio link interface to communicate with other gantry cranes or container handling equipment in the same operational area. Communication via this interface is different from communication with the TOS. For instance a different communication protocol and/or hardware are used for communication with the other cranes in the same operational area. The container handling equipment will cease operation, if the communication between them fails too frequently or for a too long time in order to avoid collisions and damages to the equipment. Hence, the communication via the radio link interval is chosen to be particularly prone against all kinds of equipment or environment caused interference to ensure that the communication with other container handling equipment is robust.

The communication controller in the illustrated figures is preferably implemented in hardware using two different wireless communication links to establish communication with the TOS and the other handling equipment in the operational area. Although not shown herein the communication controller can comprise two or more different separate communication modules, which are coupled to the respective interfaces. The interface to the HMI is wired, as operator terminal and screen may be installed on the crane. The HMI can also be installed outside the crane, enabling the operator to control movement of the crane from a different station close to the area. A central processor, ASIC or other dedicated hardware controls the different modules and structures communication between the interfaces and the execution controller.

Different modes of operation will now be explained in greater detail. In a manual operation of the crane an operator controls the movement of the crane via respective inputs, e.g. switches, joystick and the like. The communication controller provides the information of the job to be performed to the operator via the HMI as well as the location of the crane and other container handling equipment in the area. The information enables the operator to decide how he should perform the job. Any input by the operator is transmitted via the HMI to the communication controller. The communication controller forwards the input to the execution controller, which in turn controls the PLC units and the movement of the crane.

The execution controller calculates the necessary movement steps of the crane to perform the job and defines it as benchmark. During the manual execution of the job by operator the execution controller records all operator movements in comparison with the defined benchmark. Such functionality provides valuable information which can be used for operator training or for machine learning process. Successful execution of the job is transmitted to the TOS either automatically by the communication controller or again triggered by the operator.

In a semiautomatic operational mode, the communication controller processes the job provided by the TOS and guides the manual operator to the execution process. For this purpose, the communication controller presents the job to be performed in separated steps onto the operator taking into account the specific situation on the working area. These separated steps for instance include instructions or guidance to the operator to "move" the gantry of the crane to a specific location, then to move the trolley and so on. The order of the instructions may change depending on the position of other cranes working in the same operational area, the container situation of the respective area and the like. Still it is presented to the operator subsequently guiding him to perform the task in a determined order given by the communication controller. Compared to the manual mode, in which the operator has full control of the movement of the individual parts of the crane, access or movement options can be handled more restrictive in this semi-autonomous mode and controlled by the communication controller.

As the execution controller provides feedback as to the location and position of the crane parts in the area back to the communication controller, the communication controller is aware of the location and can adjust the guidance presented to the operator accordingly. Communication with other handling equipment in the area avoids collisions or potential dangerous situations.

In an autonomous mode, the communication controller fully controls the execution of jobs without interference from a manual operator. In such case, the HMI can be removed or simply be reused for control information. No input as to the movement of the crane is required. For safety and security reason the HMI can still accept emergency stops, shutting off movement of the crane instantly. The job to be performed is processed by the communication controller and source as well as destination is extracted. Any required movement is evaluated by the communication controller and aligned with information about the location of other container handling equipment to identify the most efficient path. The communication controller as discussed previously seeks permission from other cranes and container handling equipment in the operational area and reserves the necessary space in the area. When the path is cleared and at least parts of the job can be performed, the communication controller transmits the necessary high level information to the execution controller autonomously. The information transmitted does not contain specific instructions which part of the crane is to be moved, but rather high level information, such as instruction to move the crane to a specific location in the area. The execution controller translates these high level instructions into specific PLC commands to the individual parts of the cranes. During movement sensor information is relayed back to the execution controller. Such sensors information includes speed or current location and the like. The execution controller feeds back to the communication controller the processed position and/or speed information in order to enable the communication controller to update the position to the other container handling equipment. When the high level instruction is successfully performed, the execution controller reports back.

In the above example the communication controller provides position instructions to the execution controller, and leaves its execution to the controller. The execution controller is aware of the current position and calculates the distance to the instructed position accordingly. Acceleration, movement and deceleration are performed by the execution controller without interference from the communication controller. In an alternative version, the communication controller performs the calculation between the current position of the crane and the target position and instructs the execution controller to perform a specific task, like moving in a certain direction for a certain period of time. It may be suitable, if the communication controller in the autonomous mode instructs the execution controller in the same format as the instruction signal generated by the HMI in the manual operation mode.

In conventional operated container equipment the execution controller may be coupled via an interface directly to the HMI to retrieve corresponding movement instructions from the operator. The separation between execution controller and communication controller in terms of functionality provides now a greater flexibility in terms of operation. Implementing a communication controller generating the same kind of signals allows re-using existing container handling equipment for all three modes of operation and consequently a slow transition from manually operated container equipment to autonomously operated equipment. As the communication controller is in contact with other CHE in the same operational area, a mix of manually, semi-autonomous and fully autonomous cranes is possible.

In all three modes of operation, the communication controller is configured to request job sharing from another CHE in the same working area as described above. From the perspective of a manual operator or the execution controller no difference is made between a job from the TOS or from another crane irrespectively of the mode of operation.

Figure 11:
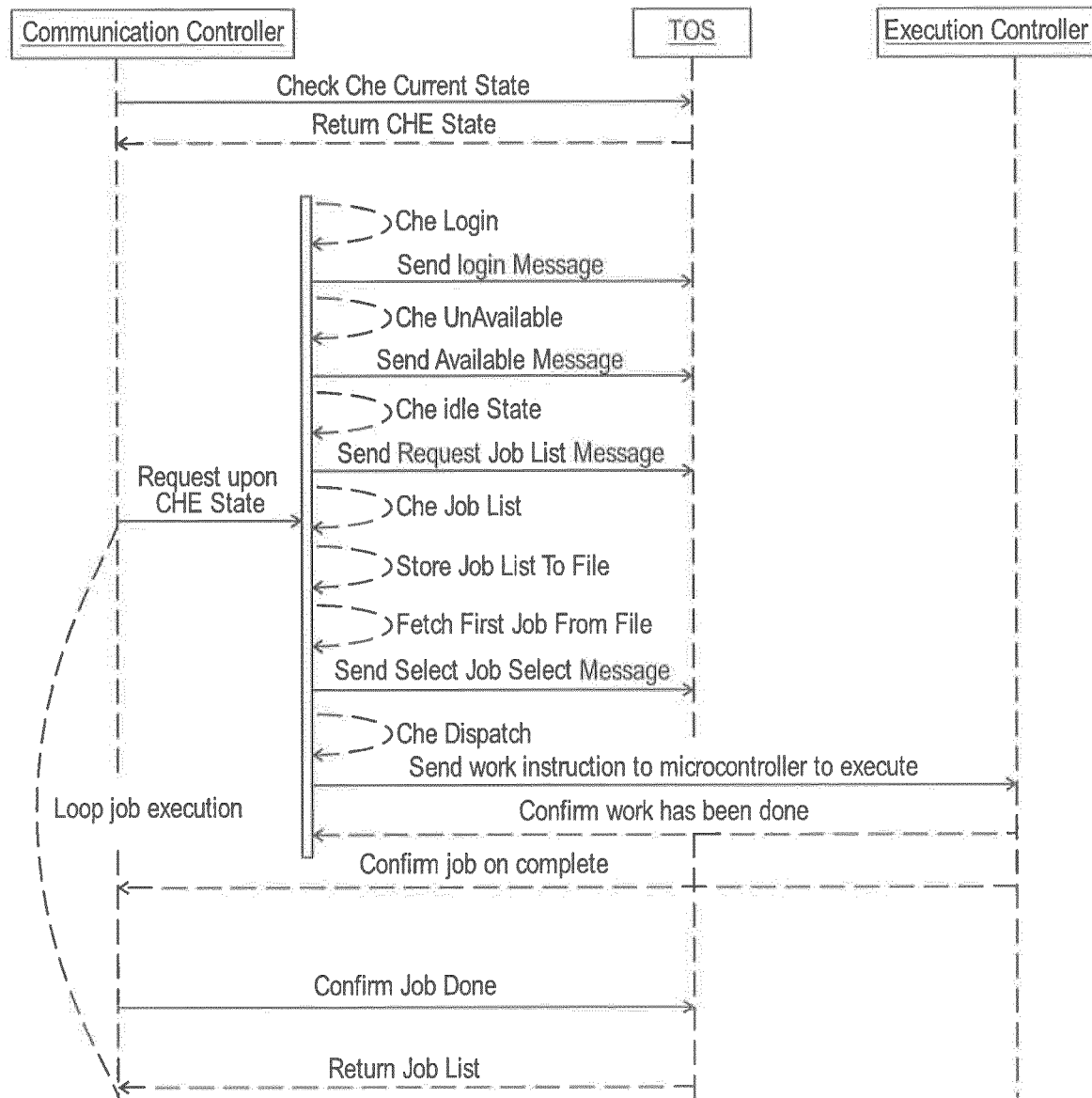
FIG. 11 illustrates a signal flow diagram between different controller and externa instances in a CHE according to the proposed principle.

FIG. 11 shows another signal flow diagram to illustrate the role split between the communication controller and the execution controller as well as the signal and information handling in the respective controllers. Some individual signal flows correspond to the process steps P20 in the master process diagram of FIG. 8. The CHE current status is checked first between the communication controller and the TOS. The communication controller then either continues to communicate with the TOS or with other handling equipment in the same operational area. This also includes the hand-shake procedure when handling equipment newly enters an operational area, in which other handling equipment is already active. In this regard the communication controller also informs the TOS about its availability after the handshake procedure to take on new jobs ("Send available message"). All these communications related to logistical operations or organizational tasks are handled by the communication controller. After a list of jobs is retrieved from the TOS or from one of the other CHEs in the operational area as a shared job. The communication controller, after storing the job in its non-volatile memory, dispatches the job, generates and sends work instructions to the execution controller. When the work instructions are completed, the execution controller reports back to either receive new instructions. Confirmation is feedback to the communication controller, when the whole job is completed. The communication controller returns this information to the TOS and then returns to the job list to perform the next job.

Further examples of embodiments and variants are set out in the following items.

1. CHE controller arrangement, comprising:
    an execution controller in operative connection with one or more engines of the CHE and configured to control movement of the CHE;
    a communication controller having a memory to at least store a job to be executed by said CHE, the communication controller further comprising
        a first interface to retrieve instructions from an external instance, and particular from a terminal operating system related to a plurality of jobs to be executed by said CHE and
        a second interface to communicate with at least a second CHE to forward at least one job of the plurality of jobs in response to a respective request by said at least one second CHE;
    a control interface between the execution controller and the communication controller to provide instructions to the execution controller responsive to an execution of said job.
2. The CHE controller arrangement according to item 1, wherein the first interface is configured to utilize a communication protocol different from a communication protocol utilized by the second interface.
3. The CHE controller arrangement according to any of the preceding items, wherein the communication controller is configured to request a job to be executed via the second interface from the at least one second CHE.
4. The CHE controller arrangement according to any of the preceding items, wherein the communication controller is configured to store at least one job retrieved via the first and/or the second interface.
5. The CHE controller arrangement according to any of the preceding items, wherein the communication controller is configured to select the at least one job of the plurality of jobs in response to a position of the at least one second CHE.
6. The CHE controller arrangement according to any of the preceding items, wherein the communication controller is configured to select the at least one job of the plurality of jobs in response to a distance between the CHE and a position of the at least one job.
7. The CHE controller arrangement according to any of the preceding items, wherein the communication controller is configured to forward to the at least one second crane its position when entering or leaving a predetermined area.
8. The CHE controller arrangement according to any of the preceding items, wherein the communication controller comprises a memory to store position information provided by said at least one second CHE.
9. The CHE controller arrangement according to any of the preceding items, wherein the communication controller is configured to provide instructions to the execution controller based on position information of said at least one second CHE.
10. The CHE controller arrangement according to any of the preceding items, wherein the communication controller is configured to transmit via the first interface to the external instance and particular to the terminal operating system information related to a completion of a job to be executed.
11. The CHE controller arrangement according to any of the preceding items, further comprising a third interface coupled to the communication controller, wherein the communication controller is configured to provide information to a manual operator related to at least one of:

a job to be executed;
a position of said CHE in a predetermined area;
a position of at least one second CHE in the predetermined area.

12. The CHE controller arrangement according to any of the preceding items, wherein the communication controller is configured to retrieve manual operator related to movement of the CHE input via a third interface and to forward such input to the execution controller via the control interface.

13. The CHE controller arrangement according to any of the preceding items, comprising a plurality of sensors coupled to the execution controller, the plurality of sensors configured to provide information about the absolute or relative position of the CHE or parts thereof.

14. The CHE controller arrangement according to any of the preceding items, wherein the execution controller is in operative connection with programmable logic controllers configured to control the movement of at least one of:
a gantry of a CHE
a trolley of the CHE
a hoist of the CHE
lock element, in particular twist lock elements.

15. The CHE controller arrangement according to any of the preceding items, wherein the execution controller is configured to provide location or position information to the communication controller.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A container handling equipment (CHE) controller arrangement, comprising:
an execution controller in operative connection with one or more engines of a CHE and configured to control movement of the CHE;
a communication controller having a memory to at least store a job to be executed by said CHE, the communication controller further comprising:
a first interface to retrieve instructions from an external instance,
wherein the external instance comprises a terminal operating system related to a plurality of jobs to be executed by said CHE; and
a second interface to communicate with at least one second CHE;
the CHE controller arrangement further comprising:
a control interface between the execution controller and the communication controller being adapted to provide instructions to the execution controller responsive to an execution of said job, and
the second interface being adapted to forward at least one job of the plurality of jobs in response to a respective request by said at least one second CHE.

2. The CHE controller arrangement according to claim 1, wherein the first interface is configured to utilize a communication protocol different from a communication protocol utilized by the second interface.

3. The CHE controller arrangement according to claim 1, wherein the communication controller is configured to request a job to be executed via the second interface from the at least one second CHE.

4. The CHE controller arrangement according to claim 1, wherein the communication controller is configured to store at least one job retrieved via the first and/or the second interface.

5. The CHE controller arrangement according to claim 1, wherein the communication controller is configured to select the at least one job of the plurality of jobs in response to a position of the at least one second CHE.

6. The CHE controller arrangement according to claim 1, wherein the communication controller is configured to select the at least one job of the plurality of jobs in response to a distance between the CHE and a position of the at least one job.

7. The CHE controller arrangement according to claim 1, wherein the communication controller is configured to forward to the at least one second CHE its position when entering or leaving a predetermined area.

8. The CHE controller arrangement according to claim 1, wherein the communication controller comprises a memory to store position information provided by said at least one second CHE.

9. The CHE controller arrangement according to claim 1, wherein the communication controller is configured to provide instructions to the execution controller based on position information of said at least one second CHE.

10. The CHE controller arrangement according to claim 1, wherein the communication controller is configured to transmit via the first interface to the external instance information related to a completion of a job to be executed.

11. The CHE controller arrangement according to claim 1, further comprising:
a plurality of sensors coupled to the execution controller, the plurality of sensors configured to provide information about an absolute or relative position of the CHE or parts thereof.

12. The CHE controller arrangement according to claim 1, wherein the execution controller is in operative connection with programmable logic controllers configured to control the movement of at least one of:
a gantry of a CHE;
a trolley of the CHE;
a hoist of the CHE; or
one or more lock elements,
wherein the one or more lock elements comprise one or more twist lock elements.

13. The CHE controller arrangement according to claim 1, wherein the execution controller is configured to provide location or position information to the communication controller.

14. The CHE controller arrangement according to claim 1, further comprising:
a third interface coupled to the communication controller, wherein the communication controller is configured to provide information to a manual operator related to at least one of:
a job to be executed;
a position of said CHE in a predetermined area; and
a position of at least one second CHE in the predetermined area.

15. The CHE controller arrangement according to claim 14, wherein the communication controller is further configured to:
retrieve an input from the manual operator related to movement of the CHE input via the third interface and to forward such input to the execution controller via the control interface.

* * * * *